United States Patent
Mitra et al.

(10) Patent No.: US 11,617,103 B2
(45) Date of Patent: Mar. 28, 2023

(54) ADAPTIVE ACCUMULATION TRIGGERS FOR ENHANCED THROUGHPUT AND PERFORMANCE

(71) Applicant: QUALCOMM Incorporated, San Diego, CA (US)

(72) Inventors: Alok Mitra, San Diego, CA (US); Sitaramanjaneyulu Kanamarlapudi, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/786,683

(22) Filed: Feb. 10, 2020

(65) Prior Publication Data

US 2021/0250808 A1 Aug. 12, 2021

(51) Int. Cl.
*H04W 28/06* (2009.01)
*H04W 76/28* (2018.01)
*H04W 76/27* (2018.01)
*H04W 28/02* (2009.01)
*H04W 80/02* (2009.01)

(52) U.S. Cl.
CPC ....... *H04W 28/06* (2013.01); *H04W 28/0268* (2013.01); *H04W 76/27* (2018.02); *H04W 76/28* (2018.02); *H04W 80/02* (2013.01)

(58) Field of Classification Search
CPC ..... H04W 28/06; H04W 76/28; H04W 76/27; H04W 80/02; H04W 28/0268
See application file for complete search history.

(56) References Cited

U.S. PATENT DOCUMENTS

| | | | |
|---|---|---|---|
| 2016/0205579 A1* | 7/2016 | Cheng | H04W 76/27 370/252 |
| 2016/0277957 A1* | 9/2016 | Patel | H04W 52/0229 |
| 2018/0132263 A1* | 5/2018 | Nuggehalli | H04W 72/1247 |
| 2018/0206174 A1 | 7/2018 | Zhou et al. | |
| 2018/0227801 A1* | 8/2018 | Dudda | H04L 47/6255 |
| 2019/0007324 A1* | 1/2019 | Sebire | H04L 47/27 |
| 2019/0215725 A1* | 7/2019 | Kim | H04L 69/04 |
| 2019/0387436 A1* | 12/2019 | Chang | H04W 88/023 |

(Continued)

OTHER PUBLICATIONS

3GPP TSG-RAN WG2 Meeting #108; R2-1915946; Source: Apple; Title: UE based PDCP Duplication Enhancement, Reno, Nevada, USA, Nov. 18-22, 2019. (Year: 2019).*

(Continued)

*Primary Examiner* — Mohammed S Chowdhury
(74) *Attorney, Agent, or Firm* — Arent Fox, LLP

(57) ABSTRACT

A user equipment (UE) may be configured with one or more queues at which packets are accumulated before being transferred between at least one higher layer and at least one lower layer. The UE may release packets from the one or more queues based on at least one set of parameters. The UE may determine one or more radio conditions associated with at least one traffic flow between the UE and a network. The UE may configure a set of parameters associated with transfer of packets for the at least one traffic flow between a lower layer of the UE and a higher layer of the UE based on the one or more radio conditions. The UE may communicate a first set of packets with the network for the at least one traffic flow based on the set of parameters.

28 Claims, 8 Drawing Sheets

(56) References Cited

U.S. PATENT DOCUMENTS

2019/0387577 A1* 12/2019 Parron ................ H04L 47/2466
2020/0092938 A1*  3/2020 Tang ..................... H04W 76/28
2020/0296627 A1*  9/2020 Arvidson .............. H04W 76/28

OTHER PUBLICATIONS

3GPP TSG RAN WG2 Meeting #108 ; R2-1916074, Source: ZTE Corporation, Sanechips; Title: Discussion on UE based PDCP Duplication activation/deactivation , Reno, USA, Nov. 18-22, 2019. (Year: 2019).*
International Search Report Written Opinion dated Apr. 7, 2021 from corresponding PCT Application No. PCT/US2020/063881.
Wang You-Chi Un et al: "QoS-provisioning 1-30 downlink resource management in 4G cellular systems", 2015 International Wireless Communications and Mobile Computing Conference ( IWCMC), IEEE, Aug. 24, 2015 (Aug. 24, 2015), pp. 67-72, XP033225332, DOI: 10.1109/IWCMC.2015.7289059 [retrieved on Oct. 2, 2015] Par. III.A.-III.C.

* cited by examiner

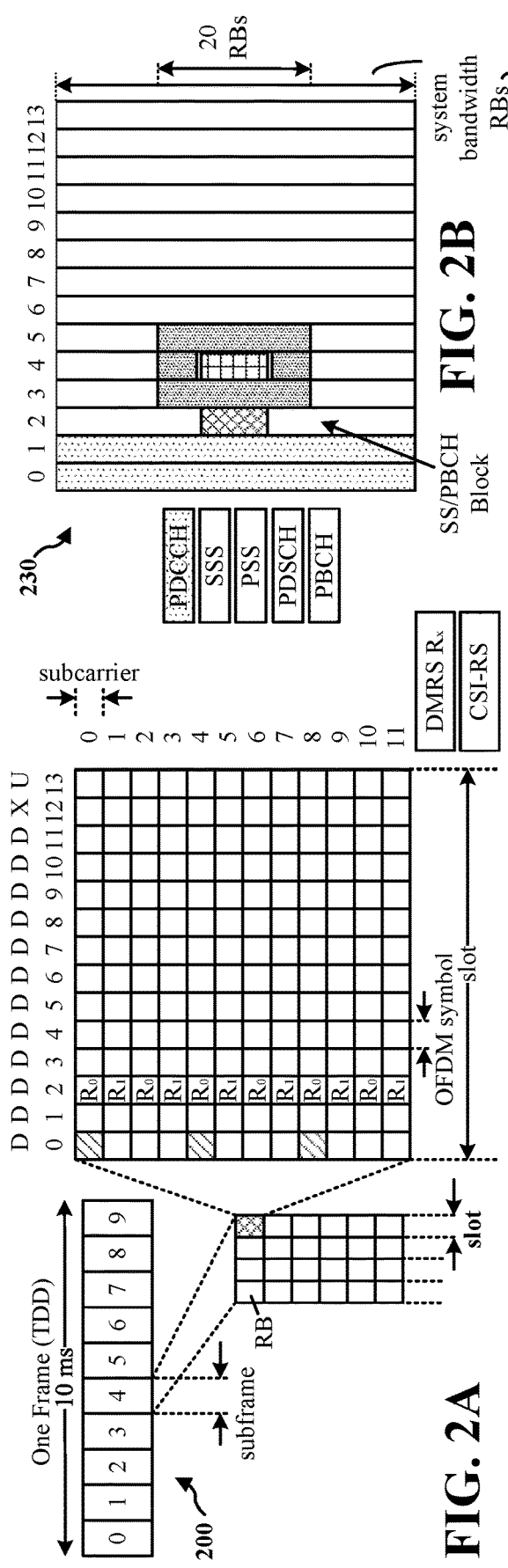
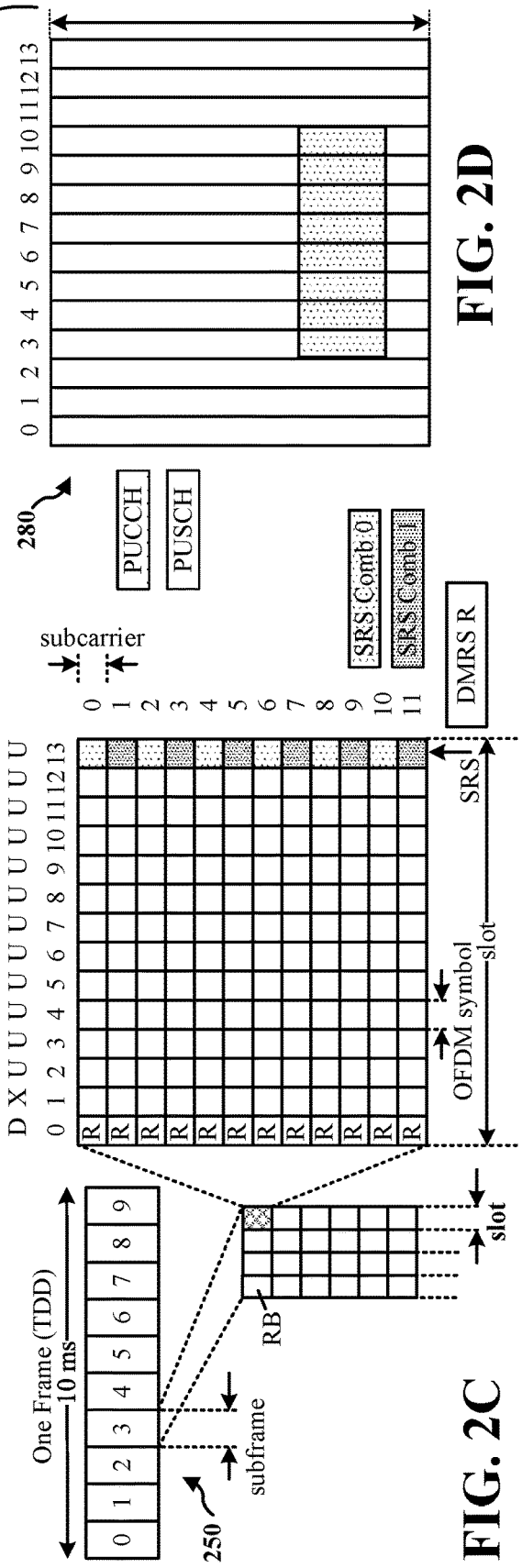

ADAPTIVE ACCUMULATION TRIGGERS FOR ENHANCED THROUGHPUT AND PERFORMANCE

BACKGROUND

Technical Field

The present disclosure relates generally to communication systems, and more particularly, to a user equipment (UE) that configures triggers for transferring packets between layers of the UE.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may include at least one protocol stack. A protocol stack may include multiple layers that each is configured to implement different functionality for a respective protocol. Packets may be transferred up and/or down the at least one protocol stack as data is received and/or transmitted, respectively.

At least one of the protocol stack layers may implement a queue, which may provide a temporary buffer so that packets are not immediately transferred up or down the protocol stack. In so doing, the queue may facilitate the smooth flow of packets between layers, thereby preventing "bursty" traffic potentially degrading throughput and performance when the UE is communicating with a base station over an access or other wireless communications network.

Packets may be released from the queue, and so transferred between layers, according to a corresponding set of parameters, which may also be referred to as "accumulation triggers." In some aspects, each of the set of parameters may be a separate condition that must be satisfied in order for packets in the queue to be released and transferred to the next layer. On a downlink traffic flow, for example, the set of parameters may include "downlink accumulation triggers" that are to be fulfilled before packets are released from the queue and transferred to the higher layers, such as the application layer. Similarly, on an uplink traffic flow, the set of parameters may include "uplink accumulation triggers" that are to be fulfilled before packets are released from the queue and transferred to the lower layers, such as the media access control (MAC) and physical (PHY) layers for transmission to the base station.

In many instances, the set of parameters may be configured according to a peak data rate configured between the UE and base station. The peak data rate may be the maximum achievable data rate under ideal conditions (e.g., notwithstanding propagation delays, channel quality, and the like). The peak data rate may be a key performance indicator (KPI) that may depend upon the amount of spectrum available for access or other wireless communications network. Additionally, the peak data rate may depend upon the peak spectral efficiency, which is the peak data rate normalized by the bandwidth. For example, the peak data rate may be the product of the available system bandwidth multiplied with the peak spectral efficiency. In various RANs, such as LTE and/or 5G NR RANs, the peak data rate may be 5 Gigabits per second (Gbps), 7 Gbps, or 10 Gbps.

The set of parameters may be designed for power performance and KPIs at the peak data rate configured between the UE and base station. Configuring the set of parameters according to the peak data rate, however, may adversely affect the traffic flow between the UE and the base station, especially when the actual data rate differs from the peak data rate by an appreciable amount. In particular, the UE may experience adverse effects in terms of increased latency and/or decreased power performance.

In view of the foregoing, a need exists for techniques and solutions to transferring data between protocol stack layers in a manner that is suitable for the current data rate configured between the UE and the base station, and specifically when the current data rate is different from the peak data rate. The present disclosure provides such techniques and solutions by providing for configuration of one or more sets of parameters associated with transfer of packets between protocol stack layers based on one or more radio conditions and/or one or more traffic flows, rather than based on the peak data rate. Accordingly, the present disclosure provides for smoother traffic flows, rather than bursty traffic flows, through the configuration of the one or more sets of parameters associated with transfer of packets between protocol stack layers.

In an aspect of the disclosure, a method, a computer-readable medium, and an apparatus are provided. The apparatus may be a UE. The UE may determine one or more radio conditions associated with at least one traffic flow between the UE and a network. The UE may configure a set of parameters associated with transfer of packets for the at least one traffic flow between a lower layer of the UE and a higher layer of the UE based on the one or more radio conditions. The UE may communicate a first set of packets with the network for the at least one traffic flow based on the set of parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
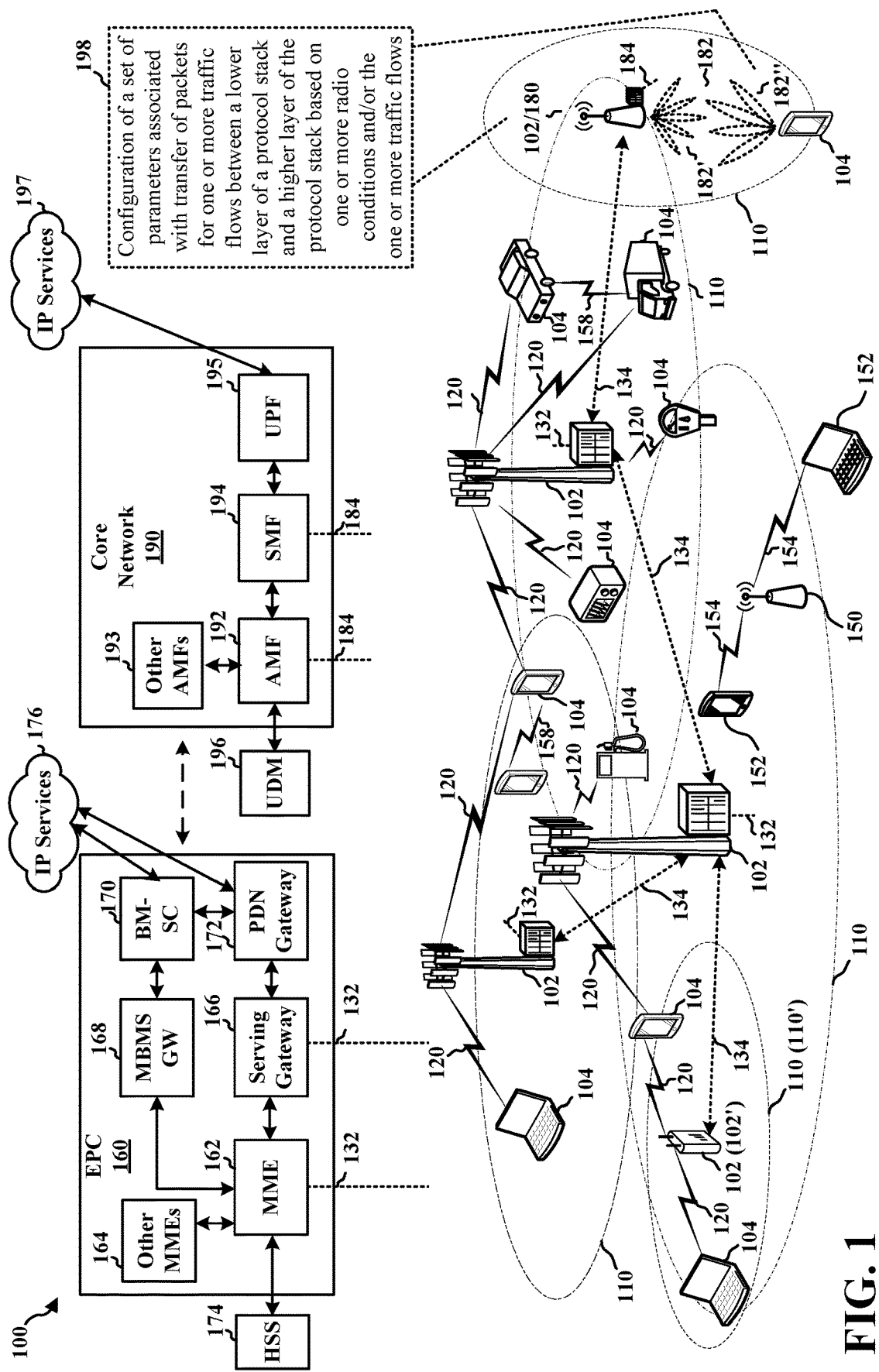
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Further, the present disclosure may focus on certain protocols, such as Transmission Control Protocol (TCP), the concepts and various aspects described herein may be applicable to other protocols, such as User Datagram Protocol (UDP) or other radio/communication protocols.

Referring again to FIG. 1, in certain aspects, the UE 104 may communicate with the base station 102/180 to establish one or more traffic flows, such as a TCP traffic flow. The UE 104 may determine one or more radio conditions associated with the one or more traffic flows established between the UE 104 and the base station 102/180. For example, the UE 104 may determine the one or more radio conditions based on a quality of a channel on which the UE 014 communicates with the base station 102/180, a power headroom configured for transmission by the UE 104, a size of an uplink grant received from the base station 102/180, a transition between a radio resource control (RRC) Idle mode or RRC Inactive mode and an RRC Connected mode, a discontinuous transmission (DTX) mode of the UE 104, and/or a discontinuous reception (DRX) mode of the UE 104.

The UE 104 may configure a set of parameters associated with transfer of packets for the one or more traffic flows between a lower layer of the UE 104 and a higher layer of the UE 104 based on the one or more radio conditions and/or based on the one or more traffic flows (198). For example, the UE 104 may configure the set of parameters based on one or more of the aforementioned radio conditions, based on whether the one or more traffic flows are uplink or downlink traffic flows, based on whether one or more of the traffic flows are relatively low priority, and/or based on whether one or more of the traffic flows are relatively high priority. The set of parameters may include a number of bytes, a number of packets, and/or a duration of timer, which may control the transfer of packets between lower layers and higher layers of at least one protocol stack of the UE 104.

In configuring the set of parameters based on the one or more radio conditions and/or the one or more traffic flows, the UE 104 may control the smooth flow of traffic between the UE 104 and the base station 102/180, thereby reducing bursty traffic between the UE 104 and the base station 102/180. For a downlink traffic flow, for example, the UE 104 may configure the one or more parameters in order to control the smooth flow of acknowledgment (ACK) packets transmitted to the base station 102/180, which may enable the smooth flow of downlink traffic from the base station 102/180.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame, which may be of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
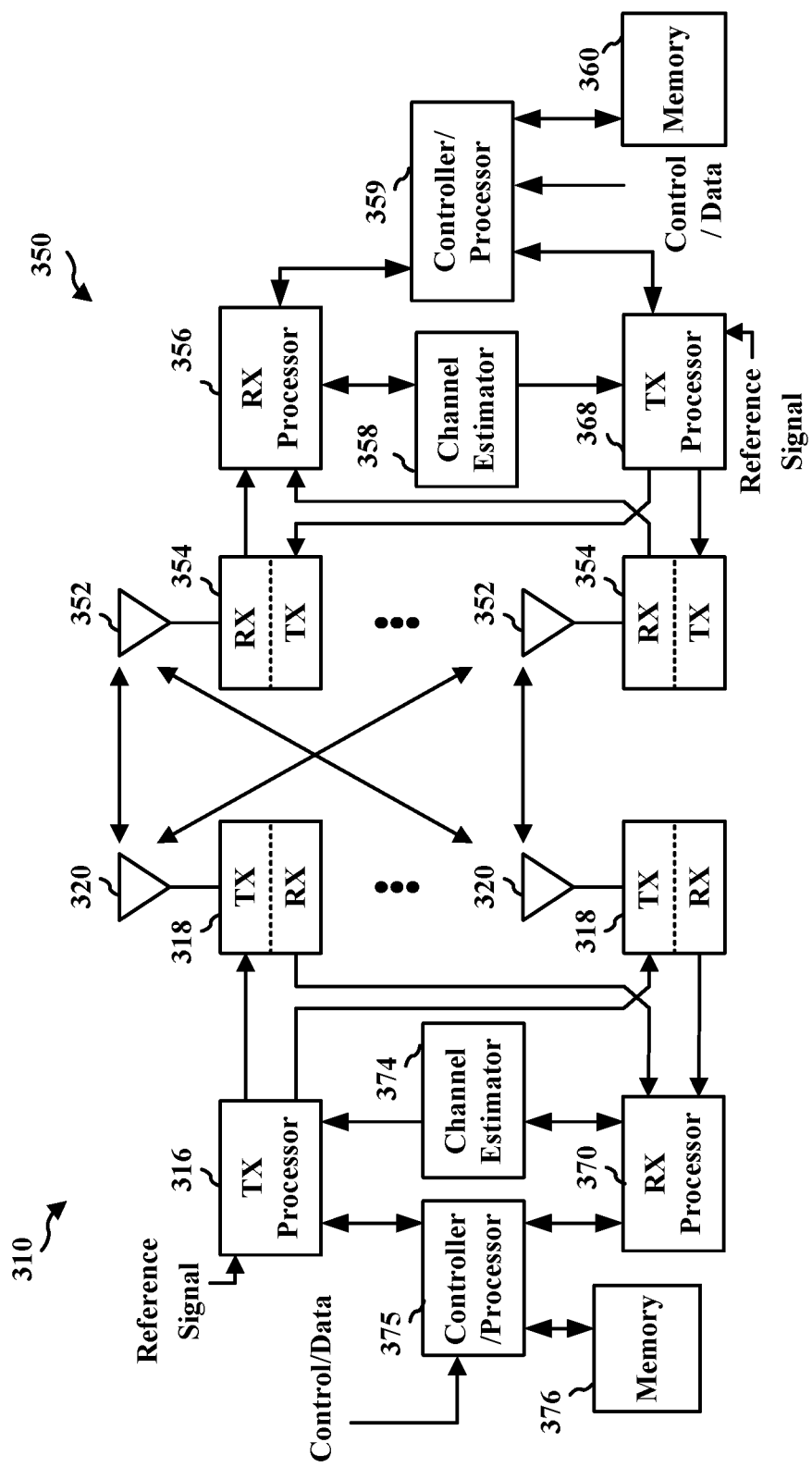
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 (L3) and layer 2 (L2) functionality. L3 includes a radio resource control (RRC) layer, and L2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with (198) of FIG. 1.

A UE may include at least one protocol stack. A protocol stack may include multiple layers that each is configured to implement different functionality for a respective protocol. Packets may be transferred up and/or down the at least one protocol stack as data is received and/or transmitted, respectively.

At least one of the protocol stack layers may implement a queue, which may provide a temporary buffer so that packets are not immediately transferred up or down the protocol stack. For example, a PDCP layer may implement a queue, which may or may not reorder received packets before transferring the received packets to higher layers. In so doing, the queue may facilitate the smooth flow of packets between layers, thereby preventing "bursty" traffic potentially degrading throughput and performance when the UE is communicating with a base station over an access or other wireless communications network.

Packets may be released from the queue, and so transferred between layers, according to a corresponding set of parameters, which may also be referred to as "accumulation triggers." In some aspects, each of the set of parameters may be a separate condition that must be satisfied in order for packets in the queue to be released and transferred to the next layer. On a downlink traffic flow, for example, the set of parameters may include "downlink accumulation triggers" that are to be fulfilled before packets are released from the queue and transferred to the higher layers, such as the TCP layer and application layers. Similarly, on an uplink traffic flow, the set of parameters may include "uplink accumulation triggers" that are to be fulfilled before packets are released from the queue and transferred to the lower layers, such as the MAC and PHY layers for transmission to the base station.

In many instances, the set of parameters may be configured according to a peak data rate configured between the UE and base station. For example, the set of parameters may be designed for power performance and key performance indicators (KPIs) at the peak data rate configured between the UE and base station. Configuring the set of parameters according to the peak data rate, however, may adversely affect the traffic flow between the UE and the base station, especially when the actual data rate differs from the peak data rate by an appreciable amount. In particular, the UE may experience adverse effects in terms of increased latency and/or decreased power performance.

FIGS. 4-8 describe techniques and solutions for transferring packets between protocol stack layers in a manner that is suitable for the current data rate configured between the UE and the base station and, in particular, when the current data rate is different from the peak data rate. For example, FIGS. 4-8 illustrate configuration of one or more sets of parameters associated with transfer of packets between protocol stack layers based on one or more radio conditions and/or one or more traffic flows, rather than based on the peak data rate. Accordingly, FIGS. 4-8 describe techniques and solutions that provide for smoother traffic flows, rather than bursty traffic flows, through the configuration of the one or more sets of parameters associated with transfer of packets between protocol stack layers.

Figure 4:
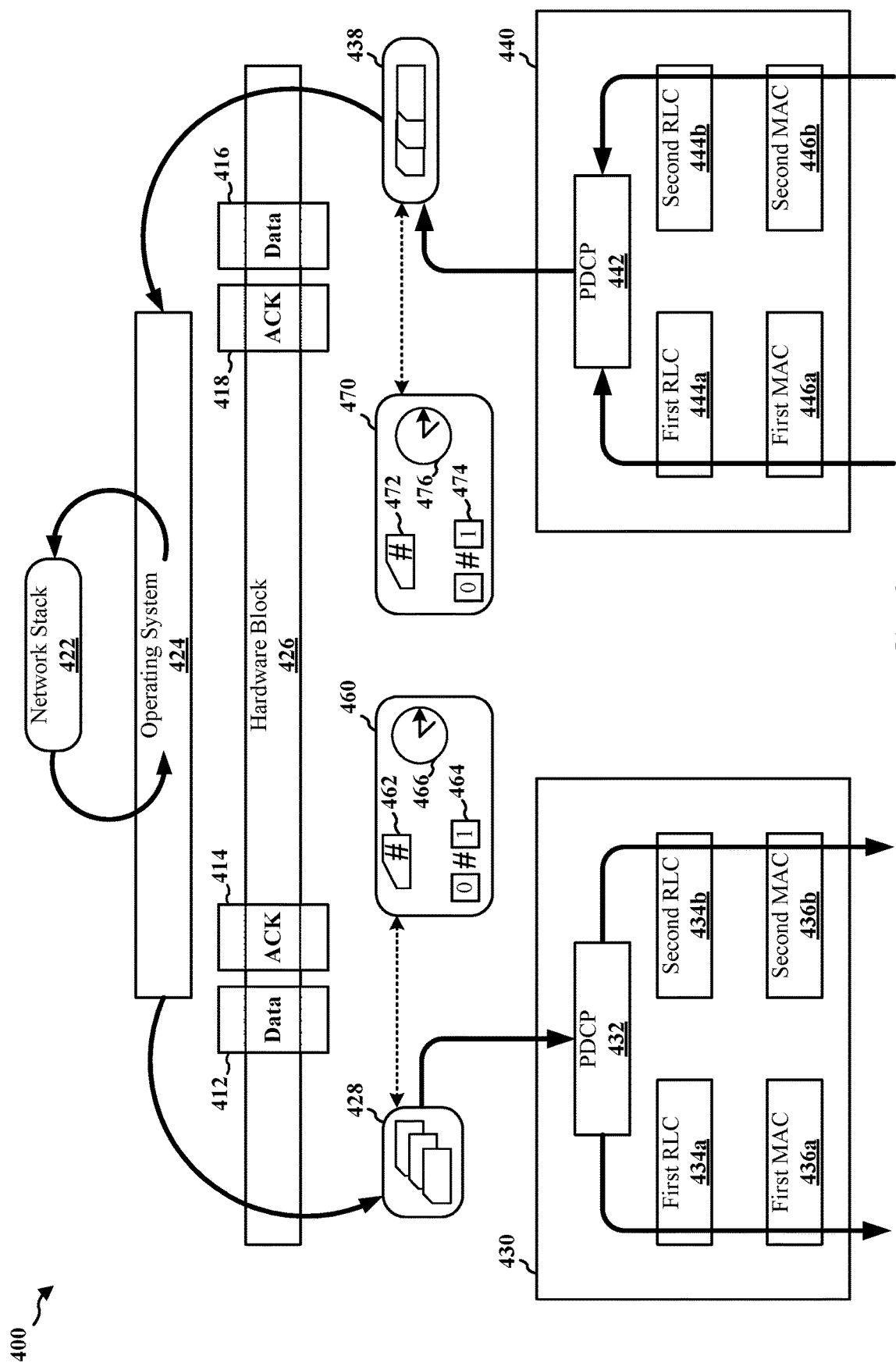
FIG. 4 is a diagram of an example architecture stack of a UE.

FIG. 4 is a diagram illustrating an example system architecture stack 400. The stack 400 may be included in a UE, such as the UE 104 of FIG. 1 and/or the UE 350 of FIG. 3. A network stack 422 may reside at the top of the stack 400, and therefore, may include one or more of the higher (potentially, the highest) layers of the stack 400. The network stack 422 may include, for example, a transport layer and/or an application layer. The transport layer of the network stack 422 may include a TCP layer and/or UDP layer, whereas the application layer may include a Hypertext Transfer Protocol (HTTP) layer and/or other application layer.

The network stack 422 may be the terminal point for some data packets 416 received from a network, such as downlink TCP packets. Further, the network stack 422 may be the origination point for some other data packets 412 to be transmitted to the network, such as uplink TCP packets. In some aspects, the network stack 422 may generate ACK packets 418 in response to successfully received data packets 416 (e.g., correctly decoded packets and/or packets that pass error/integrity checks). In some other aspects, the network stack 422 may receive ACK packets 414 in response to successfully transmitted data packets 412.

An operating system 424 may communicate with the network stack 422, such as by passing packets to and/or receiving packets from the network stack 422. In some aspects, the operating system 424 may include a Unix-like operating system, such as Linux or other similar operating system. However, the operating system 424 may include another non-Unix-like operating system in some other aspects.

Additionally, the operating system 424 may pass packets between a hardware block 426. The hardware block 426 may implement some IP layer functionality and/or other Internet/network layer functionality. For example, the hardware block may provide for routing and relaying packets across network boundaries, such as the data packets 412, 416 and/or the ACK packets 414, 418.

The network stack 422, operating system 424, and/or hardware block 426 may reside above a set of lower layers that include an uplink radio stack 430 and a downlink radio stack 440. The radio stacks 430, 440 may implement L2 and L1 functionality. While separately illustrated in the stack 400, the radio stacks 430, 440 may be combined in a single stack in some configurations.

Each of the radio stacks 430, 440 includes a respective PDCP layer 432, 442. In the illustrated stack 400, communication in two RATs may be configured. For example, a UE may be configured with dual radios for communicating in two RATs. In some aspects, a first RAT may be an LTE RAT, and a second RAT may be a 5G NR RAT. Potentially, one or more layers of the radio stacks 430, 440 may be divided to serve both the first RAT and the second RAT.

In the uplink radio stack 430, a first RLC layer 434*a* and a first MAC layer 436*a* may be configured for the first RAT, whereas a second RLC layer 434*b* and a second MAC layer 436*b* may be configured for the second RAT. In some aspects, the uplink radio stack 430 may further include a first L1 (e.g., PHY layer) configured for the first RAT, and a second L1 (e.g., another PHY layer) configured for the second RAT. Similarly, the downlink radio stack 440 may include a first RLC layer 444*a* and a first MAC layer 446*a* configured for the first RAT, and a second RLC layer 444*b* and a second MAC layer 446*b* configured for the second RAT (the downlink stack 440 may further include a first L1 (e.g., PHY layer) configured for the first RAT, and a second L1 (e.g., another PHY layer) configured for the second RAT). In some aspects, one or more divided layers may be combined.

Each of the PDCP layers 432, 442 may be include and/or may be communicatively coupled with a respective one of the queues 428, 438. For example, each of the queues 428, 438 may be a PDCP queue. In some aspects, the downlink queue 438 may provide for reordering of packets of one or both of the RATs (e.g., the downlink queue 438 may provide for reordering of packets received over an LTE RAT).

Each of the queues 428, 438 may act as an accumulation point or buffer, which may prevent packets from being transferred down or up the stack 400 as the packets are generated or received. In so doing, the queues 428, 438 may facilitate a smoother (e.g., more optimized) flow of traffic between lower layers of the stack 400 (e.g., the radio stacks 430, 440) and higher layers of the stack 400 (e.g., the hardware block 426, the operating system 424, and/or the network stack 422). Effectively, the accumulation of uplink packets in the uplink queue 428 may enable a smoother flow of packets from an application processor of the UE to a modem processor of the UE and, similarly, the accumulation of downlink packets in the downlink queue 438 may enable a smoother flow of packets from the modem processor to the application processor.

Accumulations in the uplink and downlink queues 428, 438 may improve UE performance and communication across one or more areas. For example, accumulations in the uplink and downlink queues 428, 438 may improve power performance (e.g., with respect to the number of times Peripheral Component Interconnect Express (PCIe) components are in an active state, such as in a Fusion environment), reduce bursty packet flows, improve instruction set (e.g., Microprocessor without Interlocked Pipelined Stages (MIPS)) and memory management, and/or reduce the number of interrupts served.

Packets may be released from each of the uplink and downlink queues 428, 438 according to a set of parameters. Each parameter of the set of parameters may also be referred to as an "accumulation trigger," as the set of parameters may trigger the release of accumulated packets from one of the queues 428, 438, thereby allowing the accumulated packets to be transferred down (for uplink) or up (for downlink) the stack 400.

The set of parameters may include an uplink set of parameters 460 (e.g., uplink accumulation triggers) and/or a downlink set of parameters 470 (e.g., downlink accumulation triggers). The uplink and downlink sets of parameters 460, 470 may include one or more of a respective number of packets 462, 472, a respective number of bytes 464, 474, and/or a respective timer 466, 476. For example, each of the respective numbers of packets 462, 472 may be a threshold number at which the packets are released from a corresponding one of the queues 428, 438 when satisfied (e.g., when the total number of packets in one of the queues 428, 438 is equal to the threshold number). Similarly, each of the respective numbers of bytes 464, 474 may be another threshold number at which the packets are released from a corresponding one of the queues 428, 438 when satisfied (e.g., when the sum of all bytes aggregated from all packets in one of the queues 428, 438 is equal to the other threshold number). Each of the respective timers 466, 476 may be a threshold duration at which the packets are released from a corresponding one of the queues 428, 438 when elapsed (e.g., each of the timers 466, 476 may be started when packets are released from a corresponding one of the queues 428, 438 or when the next packet is first added after earlier packets are released from the corresponding one of the queues 428, 438).

In some aspects, the uplink and downlink sets of parameters 460, 470 may be designed according to a peak data rate of the UE, for example, in order to optimize power performance and/or other KPIs at the peak data rate (e.g., peak data rates may be important measurements across UEs of varying UE capabilities). However, designing the uplink and downlink sets of parameters 460, 470 according to the peak data rate may introduce and appreciable amount of latency, such as when the actual data rate is unequal to the peak data rate. For example, designing the uplink and downlink sets of parameters 460, 470 according to the peak data rate may cause an undesirable amount of latency during lower throughputs and/or Ping procedures in which a ping message is received from a server and the UE responds with a ping response in order for the UE performance to be determined by the server.

In one example, designing the uplink and downlink sets of parameters 460, 470 according to the peak data rate may cause latency in the Ping procedures because the ping messages and/or ping response packets may be insufficient in size to meet the peak data rate-designed number of bytes and/or number of packets and the peak data rate-designed timers may have durations that are too long for the UE to receive and respond to ping packets such that the UE performance is accurately reflected. Therefore, the uplink and downlink sets of parameters 460, 470 may be configured without considering the peak data rate, for example, in order to respond to received ping packets more quickly and in a manner that more accurately reflects UE performance.

In another example, designing the uplink and downlink sets of parameters 460, 470 according to the peak data rate may cause the TCP traffic flow to scale up relatively slowly, for example, due to the TCP congestion control mechanisms. Specifically, TCP congestion control mechanisms may include TCP slow start, which may prevent transmission of more data than the network is capable of forwarding in order to avoid network congestion.

For TCP slow start, a congestion window size may be initially configured, for example, according to a maximum segment size (MSS) of 1, 2, 4, or 10. The value of the congestion window size may be increased (e.g., by 1 MSS) for each ACK packet transmitted by the UE and received by the network. If the loss of an ACK packet is detected, the network may assume that the network is congested and may take action to reduce network load, such as by reducing the congestion window size. Accumulating packets in the queues 428, 438 based on uplink and downlink sets of parameters 460, 470 designed for the peak data rate may cause the congestion window size to be increased at a more slow rate than the actual UE performance, as packets (e.g., uplink ACK packets) may be unnecessarily delayed in the queues 428, 438.

Considering the foregoing examples and other scenarios, uplink and downlink sets of parameters 460, 470 designed for a peak data rate may introduce latency that may be avoidable, particularly when the actual data rate differs from the peak data rate by 2-3 (or more) Gbps. For example, if the peak data rate is configured at 7 Gbps, but the actual data rate on a traffic flow (e.g., TCP traffic flow) is 10 Gbps or 5 Gbps, then the uplink and downlink sets of parameters 460, 470 may not be satisfied at a satisfactory rate for UE communication on the traffic flow. Therefore, a UE (e.g., implementing the stack 400) may refrain from configuring the uplink and/or downlink sets of parameters 460, 470 based on the peak data rate. Rather, the UE may configure the uplink and downlink sets of parameters 460, 470 based on one or more radio conditions and/or based on one or more traffic flows.

Figure 5:
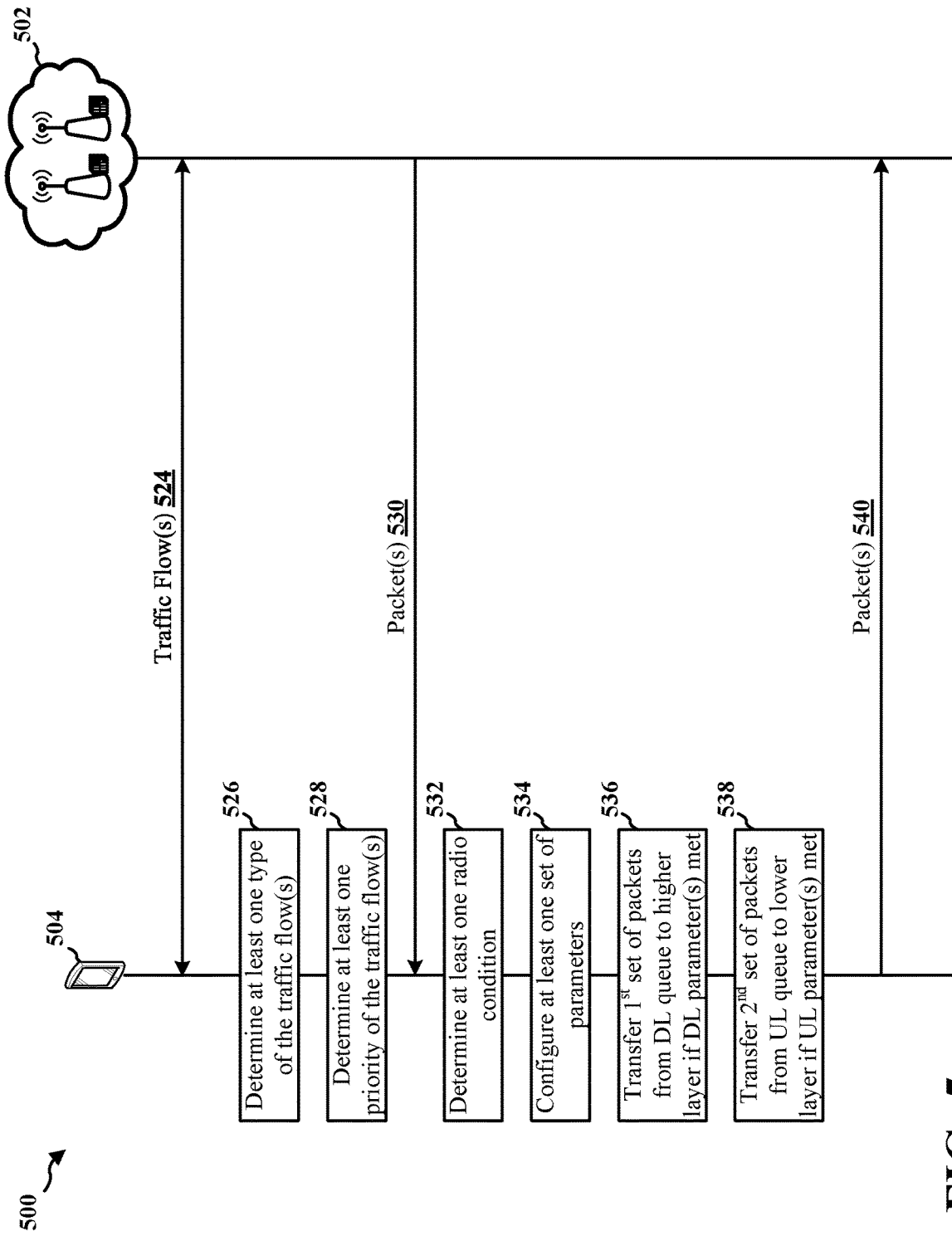
FIG. 5 is a call flow diagram illustrating example operations by a UE and a network in a wireless communications system.

FIG. 5 is a call flow diagram illustrating operations in a wireless communications environment 500 including a network 502 and UE 504. The network 502 may be an access network in which the UE 504 communicates, and the network 502 may include one or more base stations. For example, the network 502 may include a first base station configured to communicate in a first RAT (e.g., an LTE RAT) and a second base station configured to communicate in a second RAT (e.g., a 5G NR RAT), or may include one base station configured to communicate in the first RAT and/or the second RAT. Referring to FIG. 4, the UE 504 may implement the stack 400 for communication of one or more traffic flows with the network 502.

The UE 504 may establish one or more traffic flows 524 with the network 502. In some aspects, the one or more traffic flows 524 may include a TCP traffic flow. To establish a TCP traffic flow, the UE 504 and the network 502 may perform a three-way handshake. For example, the UE 504 may transmit a TCP SYN packet to the network 502, the network 502 may then transmit a TCP SYN-ACK packet to the UE 504 in response to receiving the TCP SYN packet. In response to receiving the TCP SYN-ACK packet from the network 502, the UE 504 may transmit an TCP ACK packet to the network 502, and the TCP connection may be established when the network 502 receives the TCP ACK packet from the UE 504. Potentially, the network 502 may transmit the TCP SYN packet, the UE 504 may respond by transmitting the TCP SYN-ACK packet, and the network 502 may complete the three-way TCP handshake by transmitting the TCP ACK packet in response to receiving the TCP SYN-ACK packet.

In some other aspects, the one or more traffic flows 524 may include a UDP traffic flow. In establishing a UDP traffic flow, the UE 504 may transmit a UDP datagram to the network 502, and the UDP datagram may indicate a port and/or socket (e.g., a combination of an IP address and a port). Potentially, the UE 504 may receive a UDP data from the network 502 to establish the UDP traffic flow, and the received UDP data gram may indicate a port and/or socket (e.g., a combination of an IP address and a port). The UE 504 may bind a port and/or socket to the UDP connection when establishing the UDP traffic flow.

In some further aspects, the one or more traffic flows 524 may include a ping traffic flow. In a ping traffic flow, for example, the network 502 may periodically transmit, to the UE 504, a ping packet (e.g., the ping packet may originate at a server accessible through the network 502), such as an Internet Control Message Protocol (ICMP) packet. In response to receiving the ping packet, the UE 504 may generate and transmit a ping response packet to the network 502 (e.g., the ping response packet may be forwarded to the server), and the ping response packet may likewise be an ICMP packet.

The UE 504 may have more than one of the traffic flows 524 simultaneously established with or through the network 502. In some aspects, all of the traffic flows 524 may be downlink traffic flows in which data packets flow from the network 502 to the UE 504 and the UE 504 responds to each successfully received data packet with a respective ACK packet. In some other aspects, all of the traffic flows 524 may be uplink traffic flows in which data packets flow from the UE 504 to the network 502 and the network 502 responds to each successfully received data packets with a respective ACK packet. In such other aspects, the UE 504 may retransmit data packets for which a corresponding ACK packet is not received from the network. In still further aspects, the traffic flows 524 may include one or more uplink traffic flows, as well as one or more downlink traffic flows.

The UE 504 may determine at least one type 526 of the one or more traffic flows 524. Specifically, the UE 504 may determine a respective one of the at least one type 526 for each of the one or more traffic flows 524. In some aspects, the UE 504 may determine the at least one type 526 of the one or more traffic flows 524 to indicate the direction of the one or more traffic flows 524. For example, the UE 504 may determine the at least one type 526 to indicate a respective one of uplink or downlink for each of the one or more traffic flows 524. In some other aspects, the UE 504 may determine the at least one type 526 of the one or more traffic flows 524 to indicate a respective protocol and/or information of the communication on each of the one or more traffic flows 524. For example, the UE 504 may determine the at least one type 526 to indicate a respective one of TCP, UDP, ping (e.g., ICMP), or other protocol for each of the one or more traffic flows 524.

In some aspects, the UE 504 may determine the at least one type 526 of the one or more traffic flows 524 at the data level of the UE 504 (e.g., using an application processor). Referring to FIG. 4, the UE 504 may determine the at least one type 526 at one or more of the hardware block 426, the operating system 424, and/or the network stack 422 (e.g., the transport layer and/or the application layer). The UE 504 may implement one or more filters at one or more of the hardware block 426, the operating system 424, and/or the network stack 422 in order to determine the at least one type 526. For example, filters may be implemented in both the uplink direction (e.g., including the uplink radio stack 430) and the downlink direction (e.g., including the downlink radio stack 440), and data packets 412, 416, and ACK packets 414, 418 may be transferred down or up the stack 400 through the filters.

The filters may be used to identify packet information from the contents and/or the format of the packets 412, 414, 416, 418, such as the packet header contents, packet payload contents, and/or packet format. The UE 504 may determine, from the contents of a respective one of the packets 412, 414, 416, 418, one of the traffic flows 524 with which the respective packet corresponds (e.g., the UE 504 may determine that a packet corresponds to a traffic flow based on the type of data in the packet contents and/or based on the port, socket, or other source and/or destination address indicated by the packet contents), a direction of the corresponding one of the traffic flows 524 (e.g., if the packet contents indicate ACK feedback in the uplink direction then the UE 504 may determine the corresponding traffic flow is downlink, or vice versa), and/or the protocol of the corresponding one of the traffic flows 524 (e.g., the UE 504 may determine a respective protocol of each of the packets 412, 414, 416, 418 based on the packet format and/or packet contents).

In addition to the at least one type 526, the UE 504 may determine at least one priority 528 of each of the one or more traffic flows 524. The UE 504 may determine a respective priority of the at least one priority 528 for each of the one or more traffic flows 524. A respective priority of the at least one priority 528 corresponding to one of the traffic flows 524 may indicate a priority of that one of the traffic flows 524 relative to other ones of the one or more traffic flows 524. For example, the UE 504 may assign at one of a high priority or a low priority to each of the one or more traffic flows 524; although more priorities may be available according to various aspects (e.g., high, medium, and low priorities or very high, high, average, low, and very low priorities).

The UE 504 may determine the at least one priority 528 of the one or more traffic flows 524 based on the at least one type 526 of the one or more traffic flows 524 and/or based on the data communicated over the one or more traffic flows 524 (e.g., based on inspecting packet contents). In some aspects, the UE 504 may determine a respective one of the at least one priority 528 for each of the one or more traffic flows 524 based on a tolerance for delay of each of the one or more traffic flows 524—e.g., a traffic flow for streaming media, including multimedia content and/or gaming, may be relatively delay intolerant, whereas a traffic flow for messaging or email may be relatively delay tolerant. For example, the UE 504 may determine that the at least one priority 528 includes a first priority for a first traffic flow that is relatively important and/or relatively delay intolerant and includes a second priority for a second traffic flow that is relatively unimportant and/or relatively delay tolerant, where the first priority is relatively higher than the second priority.

In some aspects, the UE 504 may determine the at least one priority 528 of the one or more traffic flows 524 at the data level of the UE 504 (e.g., using an application processor). Referring to FIG. 4, for example, the UE 504 may determine the at least one priority 528 at one or more of the hardware block 426, the operating system 424, and/or the network stack 422 (e.g., the transport layer and/or the application layer). In some other aspects, the UE 504 may determine the at least one priority 528 of the one or more traffic flows 524 at the radio level. Referring again to FIG. 4, for example, the UE 504 may determine the at least one priority 528 at one or more of the uplink radio stack 430 and/or the downlink radio stack 440, such as at one of the PDCP layers 432, 442, one of the RLC layers 434*a-b*, 444*a-b*, one of the MAC layers 436*a-b*, 446*a-b*, and/or PHY layer (e.g., using a modem or baseband processor).

The network 502 may transmit a first set of packets 530, which the UE 504 may receive. The first set of packets 530 may be associated with one or more of the traffic flows 524. For example, the first set of packets 530 may include a set of data packets, such as TCP data packets and/or UDP data packets. In another example, the first set of packets 530 may include a set of ping packets. In still another example, the first set of packets 530 may include a set of ACK packets, such as TCP ACK packets, when the traffic flows 524 include at least one uplink traffic flow.

The UE 504 may receive the first set of packets 530 at the lower layers of the UE 504. For example, the UE 504 may receive the first set of packets 530 in the first RAT, and the first set of packets 530 may include data packets for a downlink one of the traffic flows 524. Referring to FIG. 4, the UE 504 may receive the data packets 416 in the first RAT, and therefore, the data packets 416 may be transferred up from the PHY layer to the downlink first MAC layer 446a, then to the downlink first RLC layer 444a, and then to the downlink PDCP layer 442. The downlink PDCP layer 442 may accumulate the data packets 416 in the downlink queue 438, which may be controlled by the downlink set of parameters 470.

In some aspects, the UE 504 may refrain from configuring the uplink and/or downlink sets of parameters 460, 470 based on a peak data rate between the UE 504 and the network 502. Rather, the UE 504 may configure the uplink and/or downlink sets of parameters 460, 470 based on radio conditions associated with the UE 504 and/or based on the one or more traffic flows 524. To that end, the UE 504 may determine at least one radio condition 532 associated with the UE 504.

The at least one radio condition 532 associated with the UE 504 may include any information associated with communication with the network 502, both internal and external to the UE 504. That is, the at least one radio condition 532 may include settings and/or configurations of the UE 504 for communication with the network 502 and/or may include information about channel(s) and/or medium(s) on which the UE 504 communicates with the network 502. In one aspect, the at least one radio condition 532 may include a quality of the channel(s) and/or medium(s) on which the UE 504 communicates with the network 502, such as a Reference Signal Receive Power (RSRP), Reference Signal Receive Quality (RSRQ), Signal-to-Noise Ratio (SNR), Signal-to-Interference-plus-Noise Ratio (SINR), and the like.

In another aspect, the at least one radio condition 532 may include a power headroom associated with transmission by the UE 504. The transmission power of the UE 504 may be configured by the network 502, such as when the UE 504 receives information from the network 502 indicating the maximum power with which the UE 504 may transmit. The power headroom may be the amount of transmission power available for use by the UE 504 in addition to the power being used by a current transmission by the UE 504 (if applicable). As the channel(s)/medium(s) quality deteriorates, such as when the RSRP and/or SNR is relatively low, the UE 504 may need to increase transmission power in order for the network 502 to successfully receive packets from the UE 504; consequently, the power headroom of the UE 504 may be reduced.

In a further aspect, the at least one radio condition 532 may be associated with one or more uplink grants received by the UE 504 from the network 502. An uplink grant may indicate an amount of radio resources (e.g., time and frequency resources) on which the UE 504 is allowed to transmit to the network 502. For example, the UE 504 may transmit a BSR to the network 502 that indicates how many bytes (or bits) that the UE 504 is buffering for transmission to the network 502, and the UE 504 may receive an uplink grant from the network 502 in response to the BSR. The uplink grant may indicate the amount of resources (e.g., on a PUSCH) on which the UE 504 is allowed to transmit the buffered bytes. The uplink grant may be constrained by the available amount of resources and/or network capacity/congestion, and therefore, the uplink grant potentially may grant fewer resources than the UE 504 requests through BSR transmission.

In still another aspect, the at least one radio condition 532 may be associated with an RRC mode of the UE 504. The UE 504 may operate in one of a number of different RRC modes, such as an RRC Connected mode, RRC Idle mode, or RRC Inactive mode. In the RRC Connected mode, the UE 504 may have an RAN connection established with the network 502 (e.g., in both the control and user planes) and the UE access stratum (AS) context may be stored by the network 502; accordingly, the UE 504 may communicate unicast data with the network 502 and the network 502 may control the UE mobility and measurement reporting. In the RRC Idle mode, the UE 504 may control cell reselection mobility, as well as PLMN selection, and so the UE 504 may not communicate unicast data with the network 502 (although the UE 504 may continue to receive broadcast messaging and paging from the network 502). In the RRC Inactive mode, the UE 504 may function in an intermediary mode between RRC Connected and RRC Idle such that the RRC connection with the network 502 is not completely released and the UE 504 is able to quickly return to the RRC Connected mode—e.g., the UE AS context may be maintained by the network 502. The network 502 may configure the RRC mode in which the UE 504 operates, and the UE 504 may determine at least one radio condition 532 to include the frequency or rate at which the UE 504 is transitioned into and out of the RRC Connected mode.

In yet another aspect, the at least one radio condition 532 may be associated with a DTX configuration and/or DRX configuration of the UE 504. The UE 504 may receive information from the network 502 that configures the DTX cycles and/or DRX cycles of the UE 504, which may control the cycles in which the UE 504 transitions between a "sleep" or relatively low-power mode and a "wake" or relatively high-power mode in which the UE 504 may transmit data to the network 502 (for DTX) and/or receive data from the network 502 (for DRX).

The UE 504 may then configure 534 at least one of the uplink and/or downlink sets of parameters 460, 470 based on at least one of the radio conditions 532 and/or based on the one or more traffic flows 524 (e.g., based on the at least one type 526 and/or the at least one priority 528 of the one or more traffic flows 524). Potentially, the uplink and/or downlink sets of parameters 460, 470 may have been configured based on the peak data rate, such as 7 Gbps, which may support the power performance of the UE 504 with respect to an Internet Packet Accelerator (IPA) and/or PCIe of the UE 504, as well as with respect to MIPS and memory management (e.g., bursty MIPS and memory management). For example, the downlink number of packets 472 may have been configured at 250, the downlink number of bytes 474 may have been configured at 450 kilobytes (K), and the downlink timer 476 may have been configured at 6 ms for the peak data rate. However, the UE 504 may differently configure 534 the uplink and/or downlink sets of parameters 460, 470 based on the at least one radio condition 532 and/or based on the one or more traffic flows 524. Thus, the UE 504 may configure the uplink and downlink sets of parameters 460, 470 for traffic flows in any direction (e.g., uplink and/or downlink), for any type of traffic flow (e.g., TCP, UDP, etc.), and/or for any data rate (e.g., as the data rate may be affected by the at least one radio condition 532).

By way of illustration, the UE 504 may configure 534 at least one of the uplink and/or downlink sets of parameters 460, 470 based on the at least one radio condition 532 such that when radio conditions are relatively weak, such as when the RSRP, SNR, etc. fails to satisfy (e.g., is less than) a first threshold, the UE 504 may reduce one or more of the numbers of packets 462, 472, numbers of bytes 464, 474, and/or durations of timers 466, 476, for example, because the UE 504 may benefit from transmitting uplink packets more quickly in case the radio conditions are deteriorating (e.g., the RSRP, SNR, etc. is falling). In another illustration of configuring 534 at least one of the uplink and/or downlink sets of parameters 460, 470 based on the at least one radio condition 532, when the power headroom is relatively low, such as when the power headroom fails to satisfy (e.g., is less than) a second threshold, the UE 504 may reduce one or more of the numbers of packets 462, 472, numbers of bytes 464, 474, and/or durations of timers 466, 476, for example, because the UE 504 may benefit from transmitting uplink packets more quickly in case the UE 504 is unable to some uplink packets in a TTI with the available power headroom.

In a further illustration of configuring 534 at least one of the uplink and/or downlink sets of parameters 460, 470 based on the at least one radio condition 532, when the uplink grant is relatively small, such as when the uplink grant does not grant sufficient resources requested by the corresponding BSR, the UE 504 may increase one or more of the numbers of packets 462, 472, numbers of bytes 464, 474, and/or durations of timers 466, 476, for example, because the UE 504 may benefit from maintaining a larger number of packets in the uplink queue 428 when the network 502 is unable to grant sufficient resources to the UE 504.

In still another illustration of configuring 534 at least one of the uplink and/or downlink sets of parameters 460, 470 based on the at least one radio condition 532, when the UE 504 is transitioning into and out of RRC Connected mode frequently (and so into and out of RRC Idle/Inactive modes frequently), such as due to aggressive network triggers to balance the radio environment, the UE 504 may decrease one or more of the numbers of packets 462, 472, numbers of bytes 464, 474, and/or durations of timers 466, 476, for example, because the UE 504 may benefit from transmitting uplink packets more quickly in case the UE 504 is transitioned out of the RRC Connected mode and is therefore unable transmit and/or receive uplink and/or downlink packets, respectively.

In yet another illustration of configuring 534 at least one of the uplink and/or downlink sets of parameters 460, 470 based on the at least one radio condition 532, when the UE 504 is configured with relatively long DTX and/or DRX cycles, and so is in a sleep period when no transmissions and/or receptions, respectively, are occurring, the UE 504 may decrease one or more of the numbers of packets 462, 472, numbers of bytes 464, 474, and/or durations of timers 466, 476, for example, because the UE 504 may benefit from transmitting uplink packets more quickly and transferring downlink packets to higher layers more quickly because the UE 504 may shorter awake periods during which to transmit (for DTX) and/or receive (for DRX).

By way of illustration, the UE 504 may configure 534 at least one of the uplink and/or downlink sets of parameters 460, 470 based on the at least one type 526 of the one or more traffic flows 524 such that when certain types of traffic flows are established, the UE 504 may reduce one or more of the numbers of packets 462, 472, numbers of bytes 464, 474, and/or durations of timers 466, 476, for example, because the UE 504 may benefit from transmitting uplink ping packets more quickly in order to satisfy network ping tests. In another illustration of configuring 534 at least one of the uplink and/or downlink sets of parameters 460, 470 based on the at least one type 526 of the one or more traffic flows 524 such that when certain types of traffic flows are established, the UE 504 may increase or decrease one or more of the numbers of packets 462, 472, numbers of bytes 464, 474, and/or durations of timers 466, 476, for example, because the UE 504 may benefit from smoothing the uplink traffic flow (e.g., of TCP ACK packets) to efficiently scale up the congestion window for TCP slow start.

By way of illustration, the UE 504 may configure 534 at least one of the uplink and/or downlink sets of parameters 460, 470 based on the at least one priority 528 of the one or more traffic flows 524 such that when traffic flows are determined to be relatively higher priority, such as for delay-intolerant traffic flows, the UE 504 may reduce one or more of the numbers of packets 462, 472, numbers of bytes 464, 474, and/or durations of timers 466, 476, for example, because the UE 504 may benefit from transmitting uplink packets more quickly in order to satisfy delay-intolerant applications (e.g., streaming media, gaming, etc.). In another illustration of configuring 534 at least one of the uplink and/or downlink sets of parameters 460, 470 based on the at least one priority 528 of the one or more traffic flows 524 such that when traffic flows are determined to be relatively lower priority, such as for delay-tolerant traffic flows, the UE 504 may increase one or more of the numbers of packets 462, 472, numbers of bytes 464, 474, and/or durations of timers 466, 476, for example, because the UE 504 may increase power performance by allowing some delay in packet transmission and/or reception for delay-tolerant applications (e.g., email clients).

In order to configure 534 the uplink and/or downlink sets of parameters 460, 470 based on the at least one radio condition 532 and/or based on the one or more traffic flows 524, the UE 504 may set and/or may increase or decrease one or more of the uplink and/or downlink numbers of packets 462, 472, the uplink and/or downlink numbers of bytes 464, 474, and/or the uplink and/or downlink timers 466, 476. In some aspects, the UE 504 may store configuration information according to which the one or more of the uplink and/or downlink sets of parameters 460, 470 are to be configured based on the at least one radio condition 532, the at least one type 526 of the one or more traffic flows 524, and/or the at least one priority 528 of the one or more traffic flows 524. For example, the UE 504 may store configuration information that indicates a number of packets, a number of bytes, and/or a duration (e.g., a number of ms) according to which the uplink and/or downlink numbers of packets 462, 472, the uplink and/or downlink numbers of bytes 464, 474, and/or the uplink and/or downlink timers 466, 476, respectively, should be set or adjusted (e.g., upwardly or downwardly) for the at least one radio condition 532, the at least one type 526 of the one or more traffic flows 524, and/or the at least one priority 528 of the one or more traffic flows 524.

In one aspect, the UE 504 may store such configuration information according to which the one or more of the uplink and/or downlink sets of parameters 460, 470 are to be configured based on the at least one radio condition 532, the at least one type 526 of the one or more traffic flows 524, and/or the at least one priority 528 of the one or more traffic flows 524 in a table format (e.g., as a lookup table) or in another informational format. For example, the UE 504 may store a table indicating correspondence between a respective one of the at least one radio condition 532 and one or more values according to which the uplink and/or downlink numbers of packets 462, 472, the uplink and/or downlink numbers of bytes 464, 474, and/or the uplink and/or downlink timers 466, 476 should be set and/or adjusted. Similarly, the UE 504 may store a table indicating correspondence between a respective one of the at least one type 526 and/or at least one priority 528 of the one or more traffic flows 524 and one or more values according to which the uplink and/or downlink numbers of packets 462, 472, the uplink and/or downlink numbers of bytes 464, 474, and/or the uplink and/or downlink timers 466, 476 should be set and/or adjusted.

In another aspect, the UE 504 may store such configuration information according to which the one or more of the uplink and/or downlink sets of parameters 460, 470 are to be configured based on the at least one radio condition 532, the at least one type 526 of the one or more traffic flows 524, and/or the at least one priority 528 of the one or more traffic flows 524 as one or more formulas or equations (e.g., functions). For example, the UE 504 may store a respective equation for each of the numbers of packets 462, 472, the numbers of bytes 464, 474, and the timers 466, 476 that takes the at least one radio condition 532, the at least one type 526 of the one or more traffic flows 524, and/or the at least one priority 528 of the one or more traffic flows 524 as input variables, and the UE 504 may evaluate the respective equation to derive a value according to which the corresponding one of the numbers of packets 462, 472, the numbers of bytes 464, 474, and the timers 466, 476 that takes the at least one radio condition 532, the at least one type 526 of the one or more traffic flows 524, and/or the at least one priority 528 of the one or more traffic flows 524 is to be set or adjusted.

According to one aspect, the UE 504 may prioritize one of the at least one radio condition 532, the at least one type 526 of the one or more traffic flows 524, or the at least one priority 528 of the one or more traffic flows 524 over the other two. For example, if at least one priority 528 of the one or more traffic flows 524 is determined by the UE 504 to be of the most importance for configuring the sets of parameters 460, 470, the UE 504 may configure the uplink and/or downlink sets of parameters 460, 470 according to the at least one priority 528, and the UE 504 may disregard the at least one type 526 and the at least one radio condition 532.

According to another aspect, the UE 504 may configure 534 the uplink and/or downlink sets of parameters 460, 470 collectively based on the at least one radio condition 532, the at least one type 526 of the one or more traffic flows 524, or the at least one priority 528 of the one or more traffic flows 524. For example, the UE 504 may adjust one or more of the uplink and/or downlink sets of parameters 460, 470 according to the at least one type 526 of the one or more traffic flows 524, and then the UE 504 may adjust one or more of the uplink and/or downlink sets of parameters 460, 470 according to the at least one priority 528 of the one or more traffic flows 524, and finally, the UE 504 may adjust one or more of the uplink and/or downlink sets of parameters 460, 470 according to the at least one radio condition 532.

Potentially, the at least one radio condition 532, the at least one type 526 of the one or more traffic flows 524, or the at least one priority 528 of the one or more traffic flows 524 may correspond to conflicting settings or adjustments of the sets of parameters 460, 470. For example, the at least one radio condition 532 may correspond to an increase in the numbers of uplink and/or downlink packets 462, 472, whereas the at least one priority 528 may correspond to a decrease in the numbers of uplink and/or downlink packets 462, 472. However, the UE 504 may still configure the uplink and/or downlink sets of parameters 460, 470 according to the at least one radio condition 532, the at least one type 526 of the one or more traffic flows 524, or the at least one priority 528 of the one or more traffic flows 524 (e.g., by applying both the increase and the decrease), for example, because the final result of the configured uplink and/or downlink sets of parameters 460, 470 may reflect a configuration that is satisfactory across the at least one radio condition 532, the at least one type 526 of the one or more traffic flows 524, or the at least one priority 528 of the one or more traffic flows 524.

According to a further aspect, the UE 504 may differently weight the at least one radio condition 532, the at least one type 526 of the one or more traffic flows 524, or the at least one priority 528 of the one or more traffic flows 524. For example, if the at least one type 526 of the one or more traffic flows 524 is given greater weight than the at least one radio condition 532 and the at least one priority 528, the UE 504 may apply a greater adjustment for the at least one type 526 than for the at least one radio condition 532 and the at least one priority 528. Illustratively, the UE 504 may apply an offset, such as by increasing the amount by which one of the uplink and/or downlink sets of parameters 460, 470 is adjusted for the at least one type 526 and/or by decreasing the amount by which one of the uplink and/or downlink sets of parameters 460, 470 is adjusted for the at least one radio condition 532 and the at least one priority 528.

In some aspects, the UE 504 may configure 534 the uplink and downlink sets of parameters 460, 470 to be equivalent. In other words, the UE 504 may configure the uplink and downlink numbers of packets 462, 472 to be the same number of packets, the uplink and downlink numbers of bytes 464, 474 to be the same number of bytes, and the uplink and downlink timers 466, 476 to have the same duration. Potentially, the uplink and downlink sets of parameters 460, 470 may be the same set of parameters. That is, the UE 504 may store one set of parameters (e.g., one of the uplink or downlink sets of parameters 460, 470), and the UE 504 may apply the stored set of parameters to both the uplink and downlink queues 428, 438.

In some other aspects, the UE 504 may configure 534 the uplink set of parameters 460 differently from the downlink set of parameters 470. For example, the UE 504 may configure 534 the downlink set of parameters 470 so that, when the first set of packets 530 includes downlink data, the first set of packets 530 are transferred from the downlink queue 438 to the higher layers 422, 424, 426 at a relatively even rate according to the actual data rate configured between the UE 504 and the network 502. In so doing, the UE 504 may cause one or more of the higher layers 422, 424, 426 (e.g., the transport layer of the network stack 422) to generate ACK packets at a relatively even rate, rather than a more bursty rate.

Additionally, the UE 504 may configure 534 the uplink set of parameters 460 to further smooth the flow of uplink ACK packets 414, rather than causing a bursty uplink flow of ACK packets 414. A smooth uplink traffic flow may include a relatively consistent packet transmission per transmission time interval (TTI). While the number of packets per TTI may vary for a smooth uplink traffic flow, there will be very few (if any) instances of empty TTIs sequentially followed by TTIs having a maximum or near maximum number of packets.

By smoothing the flow of uplink packet transmission (thus preventing bursty uplink traffic), the UE 504 may prevent congestion controls of the network 502 (and/or other mechanisms that could potentially introduce latency to the downlink flow of data packets) from being activated. For example, the UE 504 may facilitate the expeditious increase of the congestion control window for the TCP slow start control by smoothing the flow and uplink packet transmission, for example, because a bursty uplink packet transmission may cause congestion at the network 502 and/or may increase the probability of dropped ACK packets that would trigger a decrease to the congestion control window for TCP slow start as if the network 502 were congested.

For uplink traffic flows, the UE 504 may similarly configure the uplink set of parameters 460 to cause a relatively smooth flow of uplink data packets 412. Thus, the UE 504 may prevent congestion at the network 502 and/or reduce the probability of dropped or missed packets at the network 502. In turn, the UE 504 may receive a relatively smooth flow of downlink ACK packets 418 from the network 502 responsive to the uplink data packets 412. Still, the UE 504 may configure the downlink set of parameters 470 differently from the uplink set of parameters 460, for example, in order to transfer downlink ACK packets 418 to the higher layers 422, 424, 426 such that congestion and/or the probability of dropped or missed packets is reduced.

As described, supra, the first set of packets 530 may be accumulated in the downlink queue 438 at the downlink PDCP layer 442. In some aspects, the UE 504 may reorder the first set of packets 530, such as by sequentially reordering the first set of packets 530 according to a respective sequence number indicated in each of the first set of packets 530 (e.g., a PDCP sequence number). For example, if the first set of packets 530 is received in the first RAT (e.g., LTE RAT), and so are transferred from the PHY layer to the downlink first MAC layer 446a and then to the downlink first RLC layer 444a, then the first set of packets 530 may be reordered at the downlink PDCP layer 442. In some other aspects, the UE 504 may refrain from reordering the first set of packets 530, such as when the first set of packets 530 is received in the second RAT (e.g., 5G NR RAT), and so are transferred from the PHY layer to the downlink second MAC layer 446b and then to the downlink second RLC layer 444b.

The UE 504 may determine whether at least one of the downlink set of parameters 470 is met or satisfied. For example, the UE 504 may determine whether at least one of: (1) the downlink number of packets 472 is met or exceeded (e.g., whether the number of the first set of packets 530 accumulated in the downlink queue 438, plus any other packets that may be accumulated therein, is greater than or equal to the configured downlink number of packets 472); (2) whether the downlink number of bytes 474 is met or exceeded (e.g., whether the total number of bytes summed over all of the first set of packets 530 accumulated in the downlink queue 438, plus the bytes of any other packets that may be accumulated therein, is greater than or equal to the downlink number of bytes 474), and/or whether the downlink timer 476 has expired (e.g., whether the first set of packets 530 has accumulated in the downlink queue 438 for a time period greater than or equal to the duration of the downlink timer 476, which may have been started when a first one of the first set of packets 530 was accumulated in the downlink queue 438 or may have been started based on another packet or event).

The UE 504 may transfer 536 the first set of packets 530 from the downlink queue 438 to the higher layers of the UE 504 when the UE 504 determines at least one of the downlink set of parameters 470 is met or satisfied. For example, when the UE 504 determines that at least one of the downlink set of parameters 470 is met or satisfied, the UE 504 may release the first set of packets 530 accumulated in the downlink queue 438 to the hardware block 426, operating system 424, and/or network stack 422 (potentially, the first set of packets 530 may be sequentially transferred up the higher layers 426, 424, 422).

If the first set of packets 530 include downlink data packets 416 (e.g., TCP data packets), then the UE 504 may generate ACK messages based on the downlink data packets 416. For example, the network stack 422 (e.g., transport and/or TCP layer) may generate a respective one of the uplink ACK packets 414 (e.g., TCP ACK packets) in response to each of the successfully received (e.g., successfully decoded) one of the downlink data packets 416. The ACK packets 414 may then be transferred down the stack 400 from the network stack 422, to the operating system 424, and then to the hardware block 426. From the hardware block 426, the ACK packets 414 may be accumulated in the uplink queue 428.

The UE 504 may determine whether at least one of the uplink set of parameters 460 is met or satisfied. For example, the UE 504 may determine whether at least one of: (1) the uplink number of packets 462 is met or exceeded (e.g., whether the number of the ACK packets 414 accumulated in the uplink queue 428, plus any other packets that may be accumulated therein, is greater than or equal to the configured uplink number of packets 462); (2) whether the uplink number of bytes 464 is met or exceeded (e.g., whether the total number of bytes summed over all of the ACK packets 414 accumulated in the uplink queue 428, plus the bytes of any other packets that may be accumulated therein, is greater than or equal to the uplink number of bytes 464), and/or whether the uplink timer 466 has expired (e.g., whether the ACK packets 414 have accumulated in the uplink queue 428 for a time period greater than or equal to the duration of the uplink timer 466, which may have been started when a first one of the ACK packets 414 was accumulated in the uplink queue 428 or may have been started based on another packet or event).

The UE 504 may transfer 538 the ACK packets 414 from the uplink queue 428 to the lower layers of the UE 504 when at least one of the uplink set of parameters 460 is met or satisfied. For example, when the UE 504 determines that at least one of the uplink set of parameters 460 is met or satisfied, the UE 504 may release the ACK packets 414 accumulated in the uplink queue 428 to the uplink PDCP layer 432. The uplink PDCP layer 432 may then transfer the ACK packets 414, released from the uplink queue 428, to the lower layers of the uplink radio stack.

If the ACK packets 414 are based on data packets received in the first RAT, then the uplink PDCP layer 432 may transfer the ACK packets 414 down to the uplink first RLC layer 434a, which may transfer the ACK packets 414 to the uplink first MAC layer 436a. The ACK packets 414 may then be transferred to the PHY layer for transmission in the uplink of the one or more traffic flows 524 through the first RAT. If the ACK packets 414 are based on data packets received in the second RAT, then the uplink PDCP layer 432 may transfer the ACK packets 414 down to the uplink second RLC layer 434b, which may transfer the ACK packets 414 to the uplink second MAC layer 436b. The ACK packets 414 may then be transferred to the PHY layer for transmission in the uplink of the one or more traffic flows 524 through the second RAT.

The UE 504 may then transmit, to the network 502, a second set of packets 540 that includes the ACK packets 414, which are transferred down the stack for communication with the network 502 based on the uplink and/or downlink sets of parameters 460, 470. Illustratively, the UE 504 may communicate with the network 502 based on the downlink set of parameters 470, which may control the rate at which downlink packets (e.g., downlink data packets and/or downlink ACK packets) are transferred to the higher layers 426, 424, 422, and based on the uplink set of parameters 460, which may control the rate at which uplink packets (e.g., uplink ACK packets and/or uplink data packets) are transferred down the uplink radio stack 430 for transmission to the network 502.

The UE 504 may perform similar operations when transferring uplink data packets 412 down the stack 400 and transferring downlink ACK packets 418 up the stack 400. For example, the UE 504 (e.g., the network stack 422) may generate at least a portion of the uplink data packets 412 based on the downlink ACK packets 418 transferred up the stack 400, such as when the UE 504 retransmits packets in response to missing or undetected downlink ACK packets and/or controls the rate at which uplink data packets are generated based on receiving downlink ACK packets.

In some aspects, the UE 504 may dynamically reconfigure the uplink and/or downlink sets of parameters 460, 470. For example, as one or more of the at least one type 526 of the one or more traffic flows 524, the at least one priority 528 of the one or more traffic flows 524, and/or the at least one radio condition 532 changes, the UE 504 may reconfigure one or more of the uplink and/or downlink sets of parameters 460, 470. Accordingly, the UE 504 may dynamically adapt one or more of the uplink and/or downlink sets of parameters 460, 470 as traffic flows (e.g., old connections are closed and/or new connections are opened) and/or radio conditions (e.g., channel quality improves, power headroom is reconfigured, etc.) so that the uplink and/or downlink sets of parameters 460, 470 are suitable for UE power and performance with varying traffic flows, data rates, and radio conditions.

Figure 6:
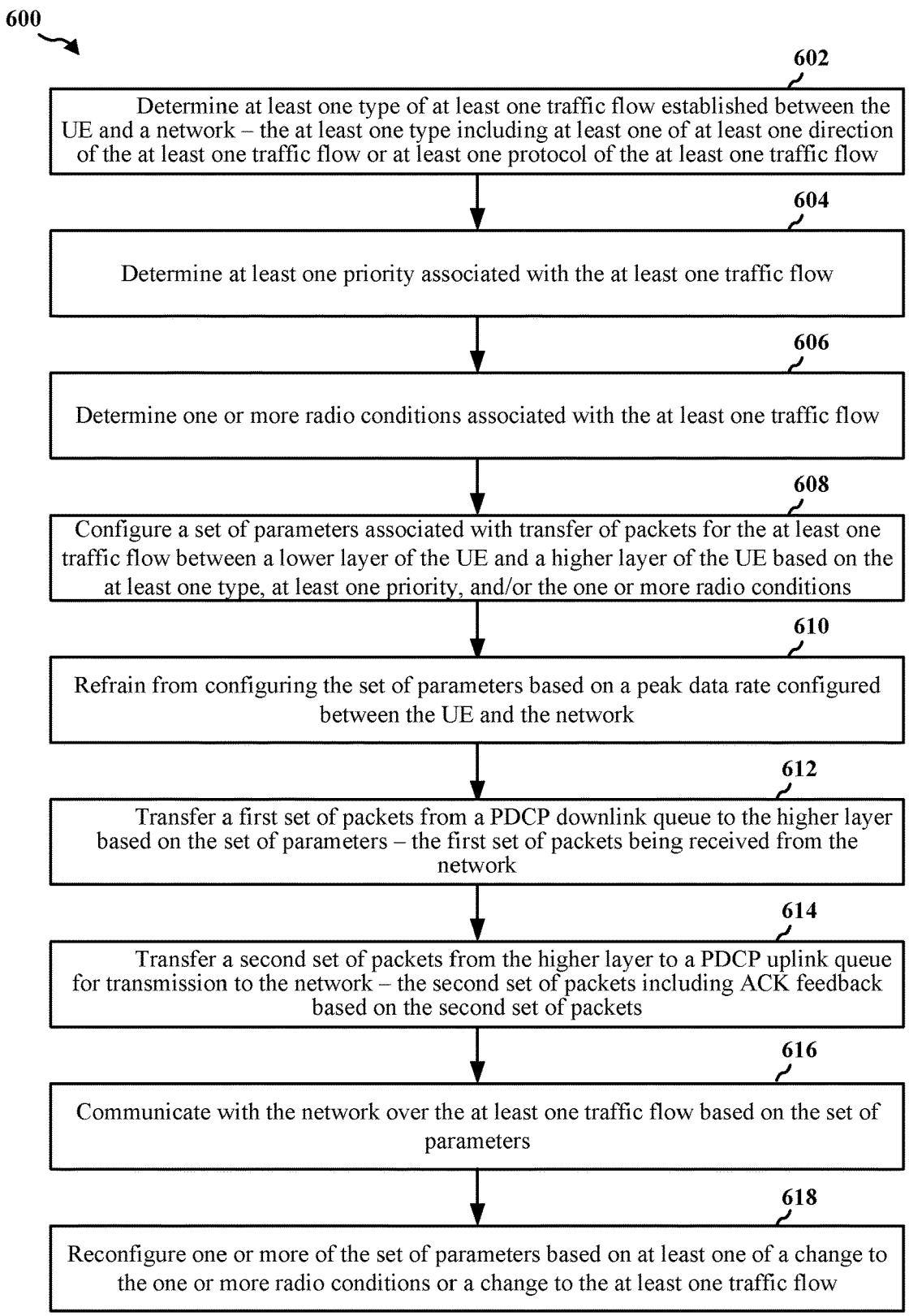
FIG. 6 is a flowchart illustrating an example method of wireless communication by a UE.

FIG. 6 is a flowchart of a method 600 of wireless communication. The method 600 may be performed by a UE (e.g., the UE 104, 350, 504; the apparatus 702/702'; the processing system 814, which may include the memory 360 and which may be the entire UE 104, 350, 504 or a component of the UE 104, 350, 504, such as the TX processor 368, the RX processor 356, and/or the controller/processor 359). According to various aspects of the method 600, one or more of the illustrated operations may be transposed, omitted, and/or contemporaneously performed.

At 602, the UE may determine at least one type of at least one traffic flow established between the UE and a network. In some aspects, the at least one traffic flow may include a TCP traffic flow and/or a UDP traffic flow, and the at least one traffic flow may include an uplink and/or downlink traffic flow. The UE may determine the at least one type of the at least one traffic flow to include at least one direction of the at least one traffic flow (e.g., uplink and/or downlink) and/or may include at least one protocol associated with the at least one traffic flow (e.g., TCP, UDP, ping, etc.). For example, the UE may establish at least one traffic flow with the network, and the UE may inspect packets transmitted and/or received on the at least one traffic flow. From the packet inspection, the UE may determine the at least one type of the at least one traffic flow. Referring to FIG. 5, the UE 504 may determine the at least one type 526 of the one or more traffic flows 524.

At 604, the UE may determine at least one priority of the at least one traffic flow. For example, the UE may inspect packets transmitted and/or received on the at least one traffic flow. From the packet inspection, the UE may determine whether data communicated on at least one traffic flow is delay-tolerant or delay-intolerant. When the UE determines that the data communicated on the at least one traffic flow is delay-tolerant, the UE may assign a relatively lower priority to the at least one traffic flow. However, when the UE determines that the data communicated on the at least one traffic flow is delay-intolerant, the UE may assign a relatively higher priority to the at least one traffic flow. Referring to FIG. 5, the UE 504 may determine that at least one priority 528 of the one or more traffic flows.

At 606, the UE may determine one or more radio conditions associated with the at least one traffic flow. The one or more radio conditions may include one or more of a quality of a channel on which the UE communicates with the network, a power headroom configured for transmission by the UE, a size of an uplink grant received from the network, a transition between an RRC Idle mode or RRC Inactive mode and an RRC Connected mode, a DTX mode of the UE, or DRX mode of the UE. Referring to FIG. 5, the UE 504 may determine the at least one radio condition 532 associated with the at least one traffic flow 524.

In some aspects, the UE may determine the quality of the channel by receiving one or more signals from the network on the channel and by measuring a value indicative of channel quality based on receiving the one or more signals (e.g., an RSRP, SNR, SINR, and so forth). In some other aspects, the UE may determine the power headroom by determining a maximum transmission power and, next, by calculating the difference of the power consumed by the UE for a current transmission (e.g., a transmission on an uplink data channel, such as a PUSCH) subtracted from the maximum transmission power. The UE may then determine whether the difference is positive, which may indicate the UE has some remaining power headroom, or not positive (i.e., zero or negative), which may indicate that the UE has no remaining power headroom.

In some further aspects, the UE may determine the size of the uplink grant received from the network by, first, transmitting a BSR to the network and, next, by receiving the uplink grant from the network based on transmitting the BSR. The UE may decode the received uplink grant in order to determine an amount of resources allocated to the UE for uplink transmissions to the network. The UE may compare the allocated amount of resources to a threshold amount of resources, which may be based on the average amount of resources granted to the UE over a set of previous uplink grants. If the UE determines that the allocated amount of resources fails to satisfy (e.g., is less than) the threshold amount of resources, the UE may determine that the uplink grant is relatively small. If the UE determines that the allocated amount of resources satisfies (e.g., meets or exceeds) the threshold amount of resources, the UE may determine that the uplink grant is not relatively small.

In still other aspects, the UE may determine the transition between the RRC Idle or RRC Inactive modes and the RRC Connected mode by, first, counting each first transition from the RRC Idle or RRC Inactive modes to the RRC Connected mode over a first time period and, next, counting each second transition from the RRC Connected mode to the RRC Idle or RRC Inactive modes over the first time period. The UE may add the first and second transitions over the first time period, and may compare the sum to a threshold. If the UE determines that the sum satisfies (e.g., meets or exceeds) the threshold, the UE may determine that the UE is frequently transitioning into and out of the RRC Connected mode. If the UE determines that the sum fails to satisfy (e.g., is less than) the threshold, the UE may determine that the UE is not frequently transitioning into and out of the RRC Connected mode.

In yet other aspects, the UE may determine the DTX mode of the UE by, first receiving one or more messages from the network that indicate at least one of: (1) a length of a DTX "sleep" cycle, in which the UE is configured to operate in a low-power mode and refrain from transmitting signaling to the network; and/or (2) a length of a DTX "wake" cycle, in which the UE is configured to operate in a high-power mode and is allowed to transmit signaling to the network. The UE may compare the DTX "sleep" cycle length to a first DTX threshold and/or may compare the DTX "wake" cycle length to a second DTX threshold. If the UE determines that the DTX "sleep" cycle length satisfies (e.g., meets or exceeds) the first DTX threshold and/or determines that the DTX "wake" cycle length fails to satisfy (e.g., is less than) the second DTX threshold, then the UE may determine that the UE is configured with relatively long DTX cycles in which the UE is configured to refrain from transmitting signaling to the network. If the UE determines that the DTX "sleep" cycle length fails to satisfy (e.g., is less than) the first DTX threshold and/or determines that the DTX "wake" cycle length satisfies (e.g., meets or exceeds) the second DTX threshold, then the UE may determine that the UE is not configured with relatively long DTX cycles in which the UE is configured to refrain from transmitting signaling to the network.

In still further aspects, the UE may determine the DRX mode of the UE by, first receiving one or more messages from the network that indicate at least one of: (1) a length of a DRX "sleep" cycle, in which the UE is configured to operate in a low-power mode and refrain from receiving signaling from the network; and/or (2) a length of a DRX "wake" cycle, in which the UE is configured to operate in a high-power mode and may receive signaling from the network. The UE may compare the DRX "sleep" cycle length to a first DRX threshold and/or may compare the DRX "wake" cycle length to a second DRX threshold. If the UE determines that the DRX "sleep" cycle length satisfies (e.g., meets or exceeds) the first DRX threshold and/or determines that the DRX "wake" cycle length fails to satisfy (e.g., is less than) the second DRX threshold, then the UE may determine that the UE is configured with relatively long DRX cycles in which the UE is configured to refrain from receiving signaling from the network. If the UE determines that the DRX "sleep" cycle length fails to satisfy (e.g., is less than) the first DRX threshold and/or determines that the DRX "wake" cycle length satisfies (e.g., meets or exceeds) the second DRX threshold, then the UE may determine that the UE is not configured with relatively long DRX cycles in which the UE is configured to refrain from receiving from the network.

At 608, the UE may configure a set of parameters associated with transfer of packets for the at least one traffic flow between a lower layer of the UE and a higher layer of the UE based on the at least one type of the one or more traffic flows, the at least one priority of the one or more traffic flows, and/or the one or more radio conditions. For example, the UE may determine an amount, according to which the at least one of the set of parameters is to be set and/or adjusted (e.g., increased or decreased), that corresponds with the at least one priority of the one or more traffic flows, and/or the one or more radio conditions, such as by accessing a lookup table and/or other configuration information that indicates such correspondence. The UE may then apply the determined amount to the at least one of the parameters, such as by adding the determined amount to or subtracting the determined amount from a current value of the at least one of the parameters or by setting the at least one of the set of parameters to the determined amount. Thus, the UE may configure a set of parameters by determining a respective value for one or more of the set of parameters, and by storing the respective value for each of the one or more of the set of parameters.

Referring to FIGS. 4-5, the UE 504 may configure 534 one or more of the uplink and/or downlink sets of parameters 460, 470 based on the at least one type 526 of the one or more traffic flows 524, the at least one priority 528 of the one or more traffic flows 524, and/or the one or more radio conditions 532. Specifically, the UE 504 may configure one or more of the number of packets 462, the number of bytes 464, and/or the duration of the timer 466 for the uplink set of parameters 460 and/or the UE 504 may configure one or more of the number of packets 472, the number of bytes 474, and/or the duration of the timer 476 for the downlink set of parameters 470.

The set of parameters may include at least one of a number of packets, a number of bytes, and/or a duration of a timer. According to various aspects, the set of parameters may include an uplink set of parameters and a downlink set of parameters. Thus, the set of parameters may include both an uplink set and a downlink set of parameters that each include a respective number of packets, a respective number of bytes, and/or a respective duration of a timer.

The uplink set of parameters may be associated with transfer of packets for the at least one traffic flow from a higher layer of the UE to a lower layer of the UE. For example, the UE may include an uplink queue in which uplink packets from higher layers are accumulated before being transferred to lower layers for transmission (e.g., transmitted over the at least one traffic flow to the network). The UE may release packets from the uplink queue when at least one of the uplink set of parameters is satisfied, such that the accumulated uplink packets are transferred to the lower layers of the UE.

The downlink set of parameters may be associated with transfer of packets for the at least one traffic flow from a lower layer of the UE to a higher layer of the UE. For example, the UE may include a downlink queue in which downlink packets from lower layers (e.g., received over the at least one traffic flow from the network) are accumulated before being transferred to higher layers. The UE may release packets from the downlink queue when at least one of the downlink set of parameters is satisfied, such that the accumulated downlink packets are transferred to the higher layers of the UE.

At 610, the UE may refrain from configuring a set of parameters associated with transfer of packets for the at least one traffic flow between a lower layer of the UE and a higher layer of the UE based on a peak data rate configured between the UE and the network. For example, first, the UE may determine the peak data rate configured between the UE and the network and, next, the UE may determine a respective value for one or more of the set of parameters based on other information that is different from the peak data rate. Referring to FIGS. 4-5, the UE 504 may refrain from configuring one or more of the uplink and/or downlink sets of parameters 460, 470 based on the peak data rate configured between the UE 504 and the network 502 and, instead, the UE 504 may configure one or more of the uplink and/or downlink sets of parameters 460, 470 the at least one type 526 of the one or more traffic flows 524, the at least one priority 528 of the one or more traffic flows 524, and/or the one or more radio conditions 532.

At 612, the UE may transfer a first set of packets from a downlink queue to the higher layer of the UE based on the set of parameters. The UE may receive the first set of packets from the network over the at least one traffic flow, and the first set of packets may include data packets and ACK packets. The UE may transfer the first set of packets up a set of lower layers of the UE, such as a PHY layer, a MAC layer, and/or an RLC layer. For example, the UE may obtain the first set of packets at a PDCP layer, and the UE may accumulate (e.g., store, buffer, etc.) the first set of packets in a downlink queue of the PDCP layer. The UE may then determine whether one or more of the set of parameters associated with the downlink queue is satisfied.

In determining whether one or more of the set of parameters associated with the downlink queue is satisfied, the UE may determine whether the number of packets accumulated in the downlink queue satisfies a downlink number of packets parameter of the set of parameters, whether the number of bytes accumulated in the downlink queue satisfies a downlink number of bytes parameter of the set of parameters, and/or whether a duration of the timer for the downlink queue is satisfied (e.g., expired). If none of the set of parameters associated with the downlink queue is satisfied, then the UE may refrain from releasing packets from the downlink queue and may continue to accumulate received packets in the downlink queue. However, if at least one of the set of parameters associated with the downlink queue is satisfied, then the UE may release the packets, including the received first set of packets, from the downlink queue and may transfer the packets up to a higher layer of the UE. The higher layer of the UE may include, for example, an operating system, a data layer, and/or a network stack, which may include a transport layer (e.g., TCP layer) and/or application layer.

Referring to FIGS. 4-5, the UE 504 may receive the first set of packets 530 from the network 502 over the one or more traffic flows 524. The first set of packets 530 may include the data packets 416 and/or the ACK packets 418, which may be received through the lower layers of the downlink radio stack 440. The UE 504 may accumulate the data packets 416 and/or the ACK packets 418 in the downlink queue 438. The UE 504 may determine whether one or more of the downlink set of parameters 470 is satisfied. For example, the UE 504 may determine whether one or more of the downlink number of packets 472 is satisfied, whether one or more of the downlink number of bytes 474 is satisfied, and/or whether the downlink timer 476 is satisfied (e.g., expired). When the UE 504 determines that one or more of the downlink set of parameters 470 is satisfied, the UE 504 may transfer 536 packets from the downlink queue 438 to the higher layers, such as the hardware block 426, operating system 424, and/or network stack 422 (e.g., the transport layer and/or application layer).

At 614, the UE may transfer a second set of packets from an uplink queue to the lower layer of the UE based on the set of parameters. In some aspects, the UE may generate the second set of packets based on the first set of packets received from the network over the at least one traffic flow—e.g., the second set of packets may include ACK packets respectively corresponding to successfully received data packets of the first set of packets. In some other aspects, the UE may generate the second set of packets to include data packets, according to which the UE may receive ACK packets from the network.

The UE may transfer the second set of packets down to a set of higher layers of the UE, such as an application layer, transport layer, data layer, operating system, and/or hardware block. The UE may obtain the second set of packets at a PDCP layer, and the UE may accumulate (e.g., store, buffer, etc.) the second set of packets in an uplink queue of the PDCP layer. The UE may then determine whether one or more of the set of parameters associated with the uplink queue is satisfied.

In determining whether one or more of the set of parameters associated with the uplink queue is satisfied, the UE may determine whether the number of packets accumulated in the uplink queue satisfies an uplink number of packets parameter of the set of parameters, whether the number of bytes accumulated in the uplink queue satisfies an uplink number of bytes parameter of the set of parameters, and/or whether a duration of the timer for the uplink queue is satisfied (e.g., expired). If none of the set of parameters associated with the uplink queue is satisfied, then the UE may refrain from releasing packets from the uplink queue and may continue to accumulate generated packets in the uplink queue. However, if at least one of the set of parameters associated with the uplink queue is satisfied, then the UE may release the packets, including the generated second set of packets, from the uplink queue and may transfer the packets up to a lower layer of the UE. The lower layer of the UE may include, for example, a radio stack having an RLC layer, MAC layer, and/or PHY layer.

Referring to FIGS. 4-5, the UE 504 may generate the data packets 412 and/or ACK packets 414 for transmission to the network 502 over the one or more traffic flows 524. A higher layer of the UE 504 may generate the data packets 412 and/or ACK packets 414, such as an application layer, transport layer, and/or other layer of the network stack 422. The UE 504 may accumulate the data packets 412 and/or the ACK packets 414 in the uplink queue 428. The UE 504 may determine whether one or more of the uplink set of parameters 460 is satisfied. For example, the UE 504 may determine whether one or more of the uplink number of packets 462 is satisfied, whether one or more of the uplink number of bytes 464 is satisfied, and/or whether the uplink timer 466 is satisfied (e.g., expired). When the UE 504 determines that one or more of the uplink set of parameters 460 is satisfied, the UE 504 may transfer 538 packets from the uplink queue 428 to the lower layers. For example, when the UE 504 is communicating with the network 502 in the first RAT, the PDCP layer 432 may release packets from the uplink queue 428 to the first RLC layer 434a and then to the first MAC layer 436a, and a PHY layer may transmit the packets over the one or more traffic flows 524 to the network 502 as the second set of packets 540.

At 616, the UE may communicate with the network over the at least one traffic flow based on the set of parameters. For example, the UE may transmit the second set of packets to the network, which may have been released from the uplink queue based on the set of parameters associated with the uplink queue. Further, the UE may receive packets from the network based on the set of parameter associated with the downlink queue, for example, because the UE may transfer downlink packets to the higher layer based on the set of parameter associated with the downlink queue and/or may generate uplink packets responsive to the downlink packets based on the set of parameter associated with the downlink queue. Referring to FIG. 5, the UE 504 may communicate the second set of packets 540 with the network 502 over the one or more traffic flows 524 based on the uplink and/or downlink sets of parameters 460, 470.

At 618, the UE may reconfigure one or more of the set of parameters based on at least one of a change to the one or more radio conditions and/or a change to the at least one traffic flow. For example, the UE may determine that one or more of radio conditions has changed, and the UE may determine an adjustment to one or more of the set of parameters based on the one or more changed radio conditions. In another example, the UE may determine that the at least one type and/or at least one priority of the at least one traffic flow has changed, and the UE may determine an adjustment to one or more of the set of parameters based on the at least one type and/or at least one priority. The UE may then set or adjust a corresponding one of the one or more parameters based on the determined adjustment. Referring to FIGS. 4-5, the UE 504 may reconfigure one or more of the uplink and/or downlink sets of parameters 460, 470 (e.g., as with the configuration 534) based on a change to the at least one type 526 of the one or more traffic flows 524, a change to the at least one priority 528 of the one or more traffic flows 524, and/or a change to the one or more radio conditions 532.

Figure 7:
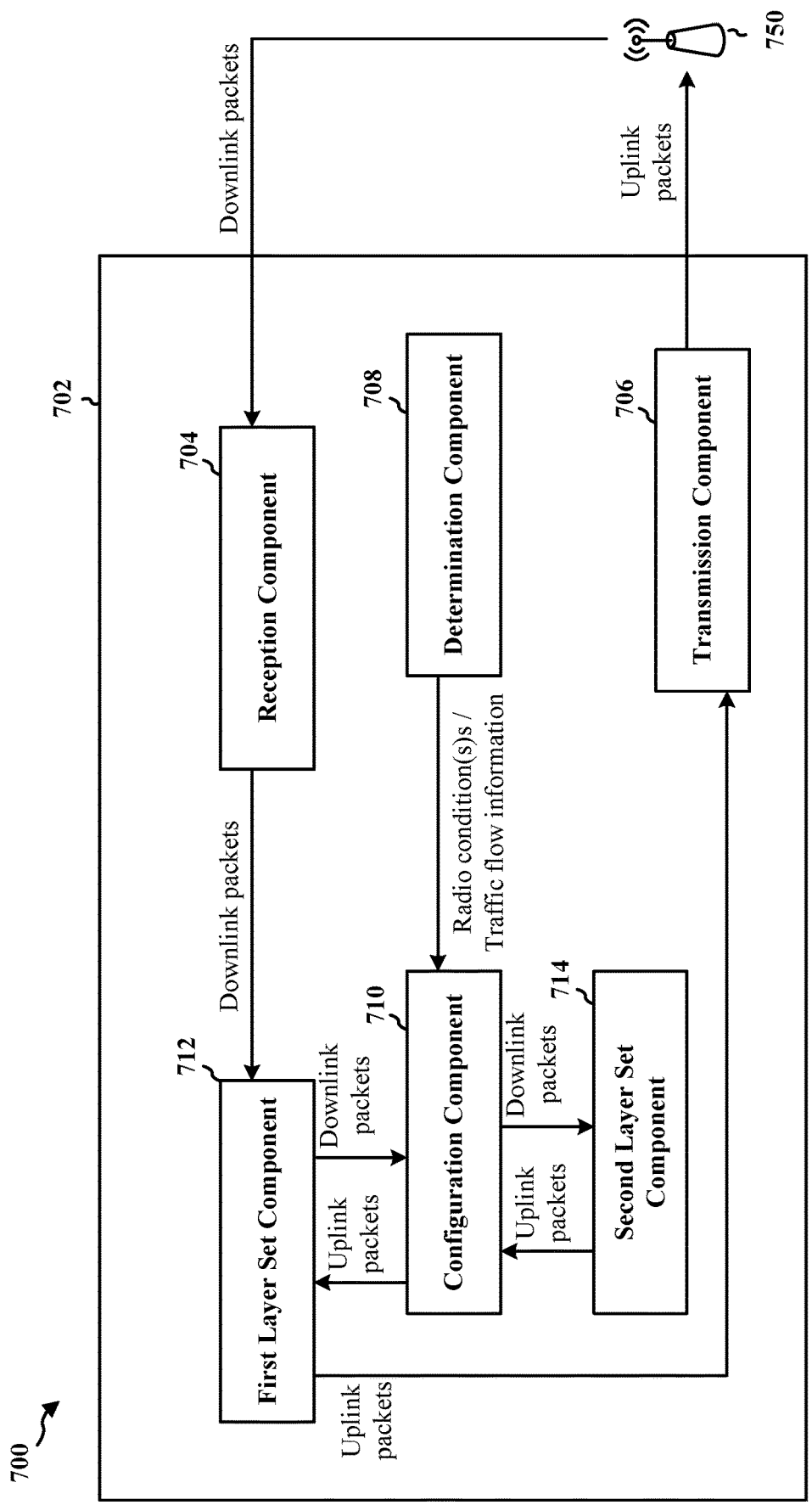
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus 702 may be a UE. The apparatus 702 may include a determination component 708 that determines at least one type of at least one traffic flow established between the apparatus 702 and a network that includes a base station 750, e.g., as described in connection with 602 of FIG. 6. In some aspects, the at least one traffic flow may include a TCP traffic flow and/or a UDP traffic flow, and the at least one traffic flow may include an uplink and/or downlink traffic flow. The determination component 708 may determine the at least one type of the at least one traffic flow to include at least one direction of the at least one traffic flow (e.g., uplink and/or downlink) and/or may include at least one protocol associated with the at least one traffic flow (e.g., TCP, UDP, ping, etc.).

The determination component 708 may further determine at least one priority associated with the at least one traffic flow, e.g., as described in connection with 604 of FIG. 6. The determination component 708 may further determine one or more radio conditions associated with the at least one traffic flow. The one or more radio conditions may include one or more of a quality of a channel on which the apparatus 702 communicates with the base station 750, a power headroom configured for transmission by the apparatus 702, a size of an uplink grant received from the base station 750, a transition between an RRC Idle mode or RRC Inactive mode and an RRC Connected mode, a DTX mode of the apparatus 702, and/or DRX mode of the apparatus 702.

The apparatus 702 may further include a configuration component 710 that may configure a set of parameters associated with transfer of packets for the at least one traffic flow between a first layer set component 712 and a second layer set component 714 based on the at least one type of the one or more traffic flows, the at least one priority of the one or more traffic flows, and/or the one or more radio conditions, e.g., as described in connection with 608 of FIG. 6. The set of parameters may include at least one of a number of packets, a number of bytes, and/or a duration of a timer. According to various aspects, the set of parameters may include an uplink set of parameters and a downlink set of parameters. Thus, the set of parameters may include both an uplink set and a downlink set of parameters that each include a respective number of packets, a respective number of bytes, and/or a respective duration of a timer.

The uplink set of parameters may be associated with transfer of packets for the at least one traffic flow from the second layer set component 714 to the first layer set component 712. For example, the configuration component 710 may include an uplink queue in which uplink packets from the second layer set component 714 are accumulated before being transferred to the first layer set component 712 for transmission. The configuration component 710 may release packets from the uplink queue when at least one of the uplink set of parameters is satisfied, such that the accumulated uplink packets are transferred to the first layer set component 712.

The downlink set of parameters may be associated with transfer of packets for the at least one traffic flow from the first layer set component 712 to the second layer set component 714. For example, the configuration component 710 may include a downlink queue in which downlink packets from the first layer set component 712 are accumulated before being transferred to the second layer set component 714. The configuration component may release packets from the downlink queue when at least one of the downlink set of parameters is satisfied, such that the accumulated downlink packets are transferred to the second layer set component 714.

The configuration component 710 may refrain from configuring a set of parameters associated with transfer of packets for the at least one traffic flow between the first layer set component 712 and the second layer set component 714 based on a peak data rate configured between the apparatus 702 and the base station 750 e.g., as described in connection with 610 of FIG. 6.

The configuration component 710 may further transfer a first set of packets from a downlink queue to the second layer set component 714 based on the set of parameters, e.g., as described in connection with 612 of FIG. 6. The configuration component 710 may further transfer a second set of packets from an uplink queue to the first layer set component 712 based on the set of parameters, e.g., as described in connection with 614 of FIG. 6. In some aspects, the second layer set component 714 may generate the second set of packets based on the first set of packets received from the base station 750 over the at least one traffic flow—e.g., the second set of packets may include ACK packets respectively corresponding to successfully received data packets of the first set of packets.

The reception component 704 and/or the transmission component 706 may communicate with the base station 750 over the at least one traffic flow based on the set of parameters as described in connection with 616 of FIG. 6. For example, the transmission component 706 may transmit the second set of packets to the base station 750, which may have been released from the uplink queue based on the set of parameters associated with the uplink queue. Further, the reception component 704 may receive packets from the base station 750 based on the set of parameter associated with the downlink queue.

In some aspects, the configuration component 710 may reconfigure one or more of the set of parameters based on at least one of a change to the one or more radio conditions and/or a change to the at least one traffic flow, e.g., as described in connection with 618 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
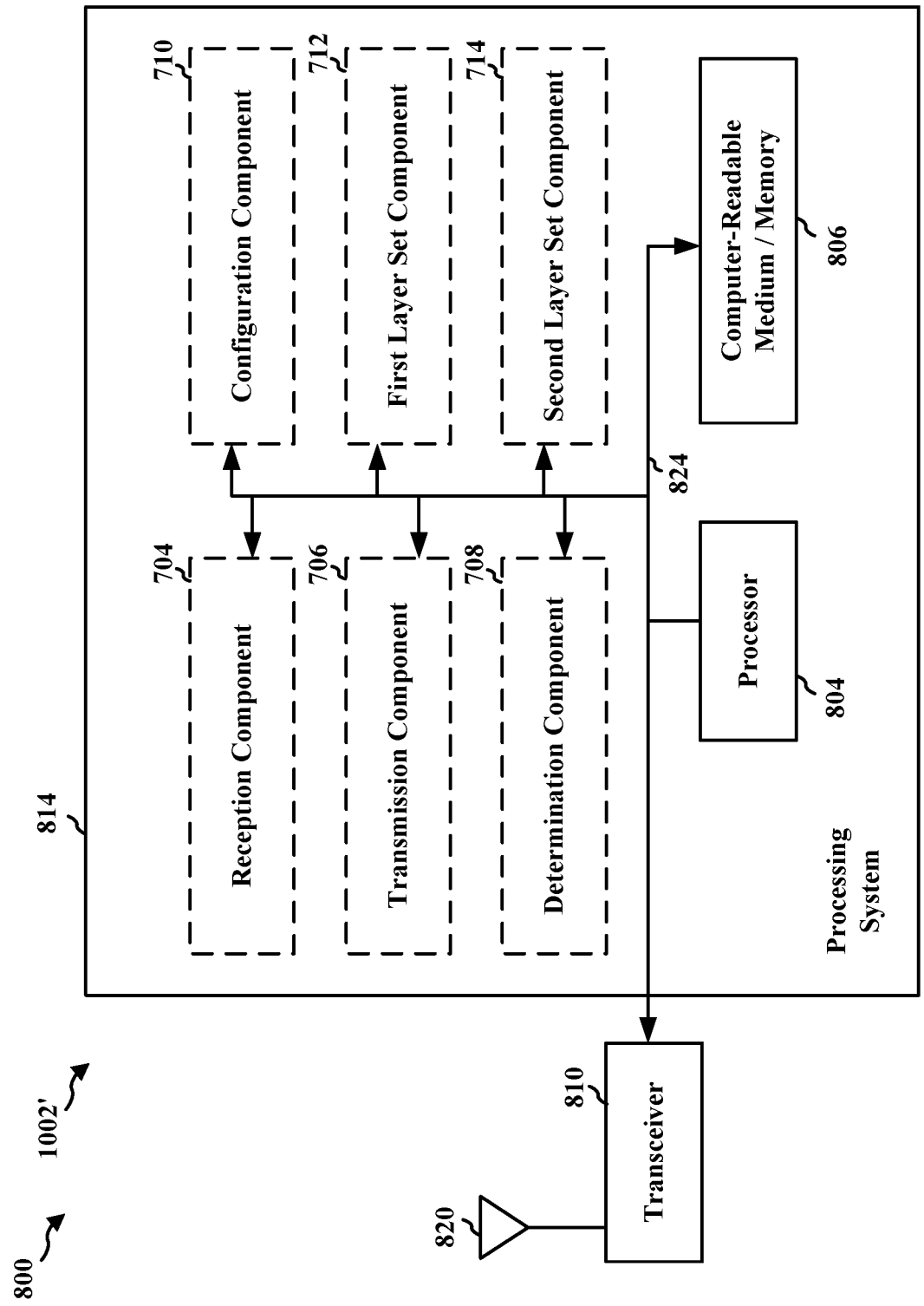
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for determining one or more radio conditions associated with at least one traffic flow between the apparatus 702/702' and a network. The apparatus 702/702' includes means for configuring a set of parameters associated with transfer of packets for the at least one traffic flow between a lower layer of the apparatus 702/702' and a higher layer of the apparatus 702/702' based on the one or more radio conditions. The apparatus 702/702' includes means for communicating a first set of packets with the network for the at least one traffic flow based on the set of parameters.

In one aspect, the one or more radio conditions is based on one or more of: a quality of a channel on which the apparatus 702/702' communicates with the network, a power headroom configured for transmission by the apparatus 702/702', a size of an uplink grant received from the network, a transition between a RRC Idle mode or RRC Inactive mode and an RRC Connected mode, a DTX mode of the apparatus 702/702', or a DRX mode of the apparatus 702/702'. The apparatus 702/702' may include means for determining at least one type of the at least one traffic flow, and the at least one type of the at least one traffic flow includes at least one of at least one direction of the at least one traffic flow or at least one protocol of the at least one traffic flow, and the set of parameters is configured further based on the at least one type of the at least one traffic flow.

The apparatus 702/702' may further include means for determining at least one priority associated with the at least one traffic flow, and the set of parameters is configured further based on the at least one priority associated with the at least one traffic flow. In one aspect, the set of parameters includes at least one of a number of bytes, a number of packets, or a duration of a timer.

The apparatus 702/702' may further include means for refraining from configuring the set of parameters based on a peak data rate associated with the at least one traffic flow. The apparatus 702/702' may further include: means for transferring a second set of packets from a PDCP downlink queue to the higher layer based on the set of parameters, wherein the second set of packets is received from the network; and means for transferring the first set of packets from the higher layer to a PDCP uplink queue for transmission to the network, and the first set of packets includes ACK feedback based on the second set of packets.

In one aspect, the lower layer includes a PDCP layer and the higher layer includes a TCP layer. In one aspect, the at least one traffic flow includes at least one of a TCP traffic flow or a UDP protocol traffic flow. In one aspect, the set of parameters includes at least one of one or more downlink accumulation triggers or one or more uplink accumulation triggers. The apparatus 702/702' may further include means for reconfiguring one or more of the set of parameters based on at least one of a change to the one or more radio conditions or a change to the at least one traffic flow.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    determining one or more radio conditions associated with at least one traffic flow between the UE and a network;
    configuring, based on the one or more radio conditions, at least one of a buffer size or a buffer timer associated with a buffer configured to buffer packets for the at least one traffic flow at a first layer before the packets are released from the buffer to a second layer, one of the first layer or the second layer comprising a lower layer of a protocol stack of the UE and another of the first layer or the second layer comprising a higher layer of the protocol stack of the UE;
    configuring one or more accumulation triggers associated with the buffer based on the one or more radio conditions, the buffering of the packets at the buffer being based on at least one of the one or more accumulation triggers or the at least one of the buffer size or the buffer timer; and
    communicating the packets with the network for the at least one traffic flow in association with buffering the packets at the buffer.

2. The method of claim 1, wherein the one or more radio conditions is based on one or more of:
    a quality of a channel on which the UE communicates with the network,
    a power headroom configured for transmission by the UE,
    a size of an uplink grant received from the network,
    a transition between a radio resource control (RRC) Idle mode or RRC Inactive mode and an RRC Connected mode,
    a discontinuous transmission (DTX) mode of the UE, or
    a discontinuous reception (DRX) mode of the UE.

3. The method of claim 1, further comprising:
    determining at least one type of the at least one traffic flow,
    wherein the at least one type of the at least one traffic flow includes at least one of at least one direction of the at least one traffic flow or at least one protocol of the at least one traffic flow, and
    wherein the at least one of the buffer size or the buffer timer is configured further based on the at least one type of the at least one traffic flow.

4. The method of claim 1, further comprising:
    determining at least one priority associated with the at least one traffic flow,
    wherein the at least one of the buffer size or the buffer timer is configured further based on the at least one priority associated with the at least one traffic flow.

5. The method of claim 1, wherein the at least one of the buffer size or the buffer timer comprises at least one of a number of bytes allowed to accumulate in the buffer before being released, a number of packets allowed to accumulate in the buffer before being released, or a duration after which packets in the buffer are released.

6. The method of claim 1, further comprising:
    refraining from configuring the at least one of the buffer size or the buffer timer based on a peak data rate associated with the at least one traffic flow.

7. The method of claim 1, further comprising:
    transferring a second set of packets from a Packet Data Convergence Protocol (PDCP) downlink queue to the higher layer based on the at least one of the buffer size or the buffer timer, wherein the second set of packets is received from the network,
    wherein the packets comprise acknowledge (ACK) feedback based on the second set of packets.

8. The method of claim 7, wherein the lower layer comprises a PDCP layer and the higher layer comprises a Transmission Control Protocol (TCP) layer.

9. The method of claim 1, wherein the at least one traffic flow comprises at least one of a Transmission Control Protocol (TCP) traffic flow or a User Datagram Protocol (UDP) protocol traffic flow.

10. The method of claim 1, further comprising:
    reconfiguring the at least one of the buffer size or the buffer timer based on at least one of a change to the one or more radio conditions or a change to the at least one traffic flow.

11. An apparatus for wireless communication by a user equipment (UE), comprising:
    means for determining one or more radio conditions associated with at least one traffic flow between the UE and a network;
    means for configuring, based on the one or more radio conditions, at least one of a buffer size or a buffer timer associated with a buffer configured to buffer packets for the at least one traffic flow at a first layer before the packets are released from the buffer to a second layer, one of the first layer or the second layer comprising a lower layer of a protocol stack of the UE and another of the first layer or the second layer comprising a higher layer of the protocol stack of the UE;
    means for configuring one or more accumulation triggers associated with the buffer based on the one or more radio conditions, the buffering of the packets at the buffer being based on at least one of the one or more accumulation triggers or the at least one of the buffer size or the buffer timer; and
    means for communicating the packets with the network for the at least one traffic flow in association with buffering the packets at the buffer.

12. The apparatus of claim 11, wherein the one or more radio conditions is based on one or more of:
    a quality of a channel on which the UE communicates with the network,
    a power headroom configured for transmission by the UE, a size of an uplink grant received from the network,
a transition between a radio resource control (RRC) Idle mode or RRC Inactive mode and an RRC Connected mode,
a discontinuous transmission (DTX) mode of the UE, or
a discontinuous reception (DRX) mode of the UE.

13. The apparatus of claim 11, further comprising:
means for determining at least one type of the at least one traffic flow,
wherein the at least one type of the at least one traffic flow includes at least one of at least one direction of the at least one traffic flow or at least one protocol of the at least one traffic flow, and
wherein the at least one of the buffer size or the buffer timer is configured further based on the at least one type of the at least one traffic flow.

14. The apparatus of claim 11, further comprising:
means for determining at least one priority associated with the at least one traffic flow,
wherein the at least one of the buffer size or the buffer timer is configured further based on the at least one priority associated with the at least one traffic flow.

15. The apparatus of claim 11, wherein the at least one of the buffer size or the buffer timer comprises at least one of a number of bytes allowed to accumulate in the buffer before being released, a number of packets allowed to accumulate in the buffer before being released, or a duration after which packets in the buffer are released.

16. The apparatus of claim 11, further comprising:
means for refraining from configuring the at least one of the buffer size or the buffer timer based on a peak data rate associated with the at least one traffic flow.

17. The apparatus of claim 11, further comprising:
means for transferring a second set of packets from a Packet Data Convergence Protocol (PDCP) downlink queue to the higher layer based on the at least one of the buffer size or the buffer timer, wherein the second set of packets is received from the network,
wherein the packets comprise acknowledge (ACK) feedback based on the second set of packets.

18. The apparatus of claim 17, wherein the lower layer comprises a PDCP layer and the higher layer comprises a Transmission Control Protocol (TCP) layer.

19. The apparatus of claim 11, wherein the at least one traffic flow comprises at least one of a Transmission Control Protocol (TCP) traffic flow or a User Datagram Protocol (UDP) protocol traffic flow.

20. The apparatus of claim 11, further comprising:
means for reconfiguring the at least one of the buffer size or the buffer timer based on at least one of a change to the one or more radio conditions or a change to the at least one traffic flow.

21. An apparatus for wireless communication by a user equipment (UE), comprising:
a memory; and
at least one processor coupled to the memory and configured to:
determine one or more radio conditions associated with at least one traffic flow between the UE and a network;
configure, based on the one or more radio conditions, at least one of a buffer size or a buffer timer associated with a buffer configured to buffer packets for the at least one traffic flow at a first layer before the packets are released from the buffer to a second layer, one of the first layer or the second layer comprising a lower layer of a protocol stack of the UE and another of the first layer or the second layer comprising a higher layer of the protocol stack of the UE;
configure one or more accumulation triggers associated with the buffer based on the one or more radio conditions, the buffering of the packets at the buffer being based on at least one of the one or more accumulation triggers or the at least one of the buffer size or the buffer timer; and
communicate the packets with the network for the at least one traffic flow in association with buffering the packets at the buffer.

22. The apparatus of claim 21, wherein the one or more radio conditions is based on one or more of:
a quality of a channel on which the UE communicates with the network,
a power headroom configured for transmission by the UE,
a size of an uplink grant received from the network,
a transition between a radio resource control (RRC) Idle mode or RRC Inactive mode and an RRC Connected mode,
a discontinuous transmission (DTX) mode of the UE, or
a discontinuous reception (DRX) mode of the UE.

23. The apparatus of claim 21, wherein the at least one processor is further configured to:
determine at least one type of the at least one traffic flow,
wherein the at least one type of the at least one traffic flow includes at least one of at least one direction of the at least one traffic flow or at least one protocol of the at least one traffic flow, and
wherein the at least one of the buffer size or the buffer timer is configured further based on the at least one type of the at least one traffic flow.

24. The apparatus of claim 21, wherein the at least one processor is further configured to:
determine at least one priority associated with the at least one traffic flow,
wherein the at least one of the buffer size or the buffer timer is configured further based on the at least one priority associated with the at least one traffic flow.

25. The apparatus of claim 21, wherein the at least one of the buffer size or the buffer timer comprises at least one of a number of bytes allowed to accumulate in the buffer before being released, a number of packets allowed to accumulate in the buffer before being released, or a duration after which packets in the buffer are released.

26. The apparatus of claim 21, wherein the at least one processor is further configured to:
refrain from configuration of the at least one of the buffer size or the buffer timer based on a peak data rate associated with the at least one traffic flow.

27. The apparatus of claim 21, wherein the at least one processor is further configured to:
transfer a second set of packets from a Packet Data Convergence Protocol (PDCP) downlink queue to the higher layer based on the at least one of the buffer size or the buffer timer, wherein the second set of packets is received from the network,
wherein the packets comprise acknowledge (ACK) feedback based on the second set of packets.

28. A non-transitory computer-readable medium storing computer-executable code for wireless communication by a user equipment (UE), the code when executed by a processor cause the processor to:
determine one or more radio conditions associated with at least one traffic flow between the UE and a network;
configure, based on the one or more radio conditions, at least one of a buffer size or a buffer timer associated with a buffer configured to buffer packets for the at least one traffic flow at a first layer before the packets are released from the buffer to a second layer, one of the first layer or the second layer comprising a lower layer of a protocol stack of the UE and another of the first layer or the second layer comprising a higher layer of the protocol stack of the UE;

configure one or more accumulation triggers associated with the buffer based on the one or more radio conditions, the buffering of the packets at the buffer being based on at least one of the one or more accumulation triggers or the at least one of the buffer size or the buffer timer; and communicate the packets with the network for the at least one traffic flow in association with buffering the packets at the buffer.

* * * * *